US006508710B1

(12) United States Patent
Paravia et al.

(10) Patent No.: US 6,508,710 B1
(45) Date of Patent: Jan. 21, 2003

(54) GAMING SYSTEM WITH LOCATION VERIFICATION

(75) Inventors: Joseph R. Paravia, San Diego, CA (US); Bruce Merati, San Diego, CA (US)

(73) Assignee: VirtGame Corp., San Diego, CA (US)

(*) Notice: Subject to any disclaimer, the term of this patent is extended or adjusted under 35 U.S.C. 154(b) by 0 days.

(21) Appl. No.: 09/472,647

(22) Filed: Dec. 27, 1999

(51) Int. Cl.[7] .......................... A63F 13/12; G06F 19/00
(52) U.S. Cl. ........................................ 463/42; 709/227
(58) Field of Search ........................ 463/25, 29, 40–42; 713/200.201; 709/227, 239; 379/93.12, 93.13, 106.01; 902/23; 705/64, 67

(56) References Cited

U.S. PATENT DOCUMENTS

| | | | | | |
|---|---|---|---|---|---|
| 4,775,937 | A | * | 10/1988 | Bell | 364/412 |
| 5,003,595 | A | | 3/1991 | Collins et al. | |
| 5,058,152 | A | * | 10/1991 | Solomon et al. | 379/67 |
| 5,083,272 | A | * | 1/1992 | Walker et al. | 364/412 |
| 5,119,295 | A | * | 6/1992 | Kapur | 364/412 |
| 5,618,232 | A | | 4/1997 | Martin | |
| 5,672,106 | A | * | 9/1997 | Oxford et al. | 463/28 |
| 5,830,069 | A | * | 11/1998 | Soltesz et al. | 463/42 |
| 5,873,782 | A | * | 2/1999 | Hall | 463/25 |
| 5,921,865 | A | * | 7/1999 | Scagnelli et al. | 463/17 |
| 6,058,250 | A | * | 5/2000 | Harwood et al. | 709/227 |
| 6,104,815 | A | | 8/2000 | Alcorn et al. | |

FOREIGN PATENT DOCUMENTS

| | | |
|---|---|---|
| GB | 2 121 569 A | 12/1983 |
| WO | WO 98 30297 | 7/1998 |

OTHER PUBLICATIONS

'Napster', www.napster.com, May 1999, company profile.*

* cited by examiner

*Primary Examiner*—Mark Sager
*Assistant Examiner*—Steven Ashburn
(74) *Attorney, Agent, or Firm*—Procopio, Cory, Hargreaves & Savitch, LLP

(57) ABSTRACT

A system and method for providing an automated gaming service to one or more players can be implemented in a computer-based environment allowing automated computation of wagers, payouts, and other gaming parameters. The automated gaming system can be implemented in an Internet or other network-type environment such that various players can access the automated gaming system from remote locations, thus establishing a virtual gaming environment. Player accounts can be established and players can be granted access to the system and to their accounts. The accounts can be set up as debit-type accounts, whereby a player funds or replenishes his or her account in advance of wagering, using a credit card or other payment technique. Various gaming environments or formats can be established to provide flexibility in implementing the system and handling various games or other events. The system can use a pari-mutuel or guaranteed-payout gaming formats, among others. Other embodiment of the present invention utilizes player location apparatus to evaluate the general location of the player to regulate access to players in authorized locations.

5 Claims, 13 Drawing Sheets

GAMING SYSTEM WITH LOCATION VERIFICATION

BACKGROUND OF THE INVENTION

1. Field of the Invention

The present invention relates generally to gaming and more specifically to a system and method for providing interactive gaming using computer resources.

2. Related Art

The proliferation of processors and processor-based systems in recent years has led to a tremendous increase in the ability of businesses, industry and individuals to expand their operations, organize and share large amounts of information, and offer new products and services to clients and customers. Most computers and workstations in today's homes and offices are connected in some manner to another computer or workstation, either locally or remotely. An early form of such inter-connection of computing systems was a direct connection via a modem, which was eventually enhanced using technology such as the local area network (LAN). Using LAN technology, several computers, workstations, peripherals, or other related devices can be connected to share data among one another and to share network resources.

The Internet can be thought of as an extension of local area network technology. The Internet, which started in the late 1960s, is a vast computer network consisting of many smaller networks that span the entire globe. The Internet originally began as a communication network through which government researchers, scientists and other personnel could exchange data or other information between offices and facilities throughout the world. Eventually, the Internet became accessible to the public. Initially, the public was slow to embrace the Internet, and it seemed as if the Internet would remain nothing more than a way for a select group of technologists to exchange e-mails and other data or information. Eventually, however, entrepreneurs who envisioned the growth of the consumer market for Internet services were able to attract a large number of consumers into the fold. As a result, a sort of snowball effect ensued in which more and more consumers became Internet users, and in turn, more and more businesses rushed to get web pages set up on an Internet server. With more businesses offering information, products and services on the Web, more consumers were attracted to the Internet. This cycle rapidly fed on itself virtually creating an explosion on the Internet.

However, the proliferation of the Internet did not stop with simply making web pages available to the Internet users, or web surfers. In the true capitalistic spirit, providers of goods and services began offering enhanced web services as add-on features to their goods and services. Seemingly overnight, entrepreneurs and businesses jumped on to the Internet bandwagon. On top of that, hundreds, if not thousands, of new businesses were created to offer Internet-related services.

SUMMARY OF THE INVENTION

The present invention is directed toward a system and method for providing an automated gaming service to one or more players. According to one aspect of the invention, the automated gaming system can be implemented in a computer-based environment allowing automated computation of wagers, payouts, and other parameters to enhance the gaming experience. According to yet another aspect of the invention, the automated gaming system can be implemented in an Internet or other network-type environment such that various players can access the automated gaming system from remote locations, thus establishing a virtual gaming environment.

In computer-based implementations, players can be granted access to the system via a sign-on process or other access technique. According to one aspect of the invention, player accounts can be established and players can be granted access to the system and to their accounts using, for example, user name and password techniques, or other access techniques.

In one embodiment, player profiles or other data formats can be implemented to store and track player information at a variety of different levels, depending on the system implementation. Furthermore, according to one aspect of the invention, one or more accounts can be set up for each player. Preferably, in one embodiment, the accounts are set up as debit-type accounts, whereby a player funds or replenishes his or her account in advance of wagering, using a credit card or other payment technique.

In accessing the system and placing wagers, the funds for those wagers are drawn from the funds available in the user's account. The player can access his or her account to replenish funds as desired or to withdraw funds and perhaps to even zero out or close the account. The system can be implemented to accept various forms of payment including, for example, credit card payments and wire transfers. To pay funds to a player from his or her account, the system can be set up to send the player a check or money order, to credit the player's credit card account, to wire transfer funds to a designated account, or pay the player using various other payment techniques.

According to yet another aspect of the invention, various gaming environments or formats can be established to provide flexibility in implementing the system and handling various games or other events. For example, in one implementation, the system can use a pari-mutuel gaming format that allows the odds or the payout to be adjusted as the betting continues, to help entice betters to or away from a particular competitor. Additionally, the sliding odds can be implemented with or without a point spread. In one embodiment, the point spread can also be adjusted, although it is preferably fixed. Adjusting the point spread can further help to entice players to or away from one or more competitors. These features of adjusting the odds:and changing the point spread can be implemented alone or in combination to help "even out" betting for a particular competition.

According to yet another aspect of the invention, an alternative gaming environment or format that can be established and implemented is a guaranteed-payout format. According to this format, a player can be guaranteed the payout amount at the time the wager is placed. This format may be more attractive to players in that with a guaranteed payout, the amount they receive is not subject to diminution as more and more players place wagers on that competitor.

To minimize or help reduce exposure in covering guaranteed payout amounts, a sliding scale or scales can be implemented to adjust the payout amounts for subsequent wagers. Thus, if a competitor in the event is highly favored, it may be advantageous to a player to place an early wager and get a relatively high payout amount. In this embodiment where payout amounts can be adjusted for subsequent wagers, the system may decrease the payout amount for a side or a competitor that has been heavily wagered, and increase the payout amount for a side that is not so heavily wagered in order to entice players to wager on the underdog or underwagered side.

As described herein, in one embodiment, a computer system known as the invention can be implemented to allow players to access the system via electronic communications means such as a network, a direct connection, or even the Internet. Other connectivity techniques can be provided as well to allow flexibility or to enable the system to grant access to one or more players in various locations and from various systems.

In another embodiment of the present invention, a computer system known as the gaming server is equipped with a location verification module. In one configuration, the location verification module operates in connection with the gaming server to establish a direct communication link to the player and to determine the location of the player. The location of the player is evaluated based on ANI numbers, such as for example, caller-ID numbers. In another configuration the location verification module determines the location of the player based on the verifiable address of the computer the player uses to access the network.

In the location verification embodiment the player utilizes a shared computer network to access a gaming server. Upon accessing the gaming server the player views gaming or wagering options including payout amounts. The player may optionally select a gaming selection with wager amount. Upon confirming the gaming selections and wager amount the gaming system disconnects from the player and independently establishes a direct communication link with the player's computer or terminal.

In another embodiment of the system, the location verification module works in conjunction with an Internet Service Provider (ISP). Customers can access the Internet for non-wagering purposes, using equipment provided by the ISP. In this embodiment, wagering information can be viewed, such as the kind of information that shows the current odds for wagering on sporting events. Other Internet information is accessible, such as would be generally available to users of the Internet. When a customer wants to actually place a wager, two levels of location verification come into play. The ISP firstly ensures that a user is dialing up from a verifiable location where wagering is allowed. Secondly, the location verification module also ensures that the source of the wager request is from a location where wagering is allowed. The two systems work in concert to verify the location. In a different embodiment of the system, an establishment, such as a casino, plays the role of a dedicated ISP. It is similar to the previous embodiment except that there is no general connection to the Internet. A customer is limited to viewing information and placing wagers according to what is being offered by the casino.

Further features, advantages, and aspects of the invention are described in detail below in terms of one or more various embodiments or implementations.

DETAILED DESCRIPTION OF THE PREFERRED EMBODIMENTS

1. Introduction and Overview

Figure 1:
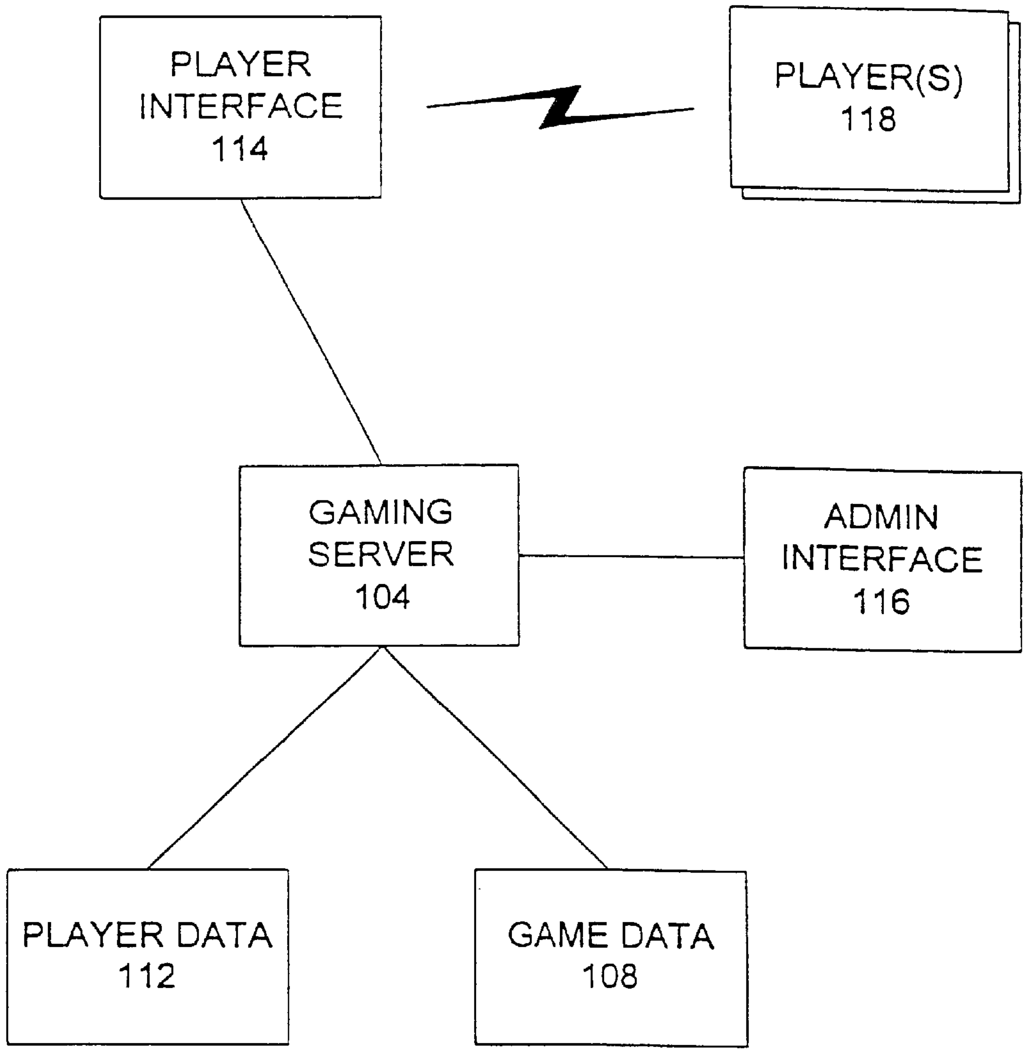
FIG. 1 is a functional block diagram generally illustrating functionality of the automated gaming system according to one embodiment of the invention.

The present invention is directed toward a system and method for providing automated gaming to a plurality of players via a computerized delivery system. For example, in one application, the automated gaming is provided on one or more servers, accessible by players via a computer interface such as, for example, the Internet or other computer network. According to one aspect of the invention, conventional gaming techniques as well as new gaming techniques can be automated and made available to players at various locations to provide an enhanced gaming atmosphere.

2. Example Environment

Before describing the invention in detail, it is useful to describe a simple example environment in which the invention can be implemented. One such example environment is a computer network such as, for example, the Internet.

The Internet, introduced above, provides one technique for making automated gaming available to a variety of gaming players, in a variety of different locations. Using the example Internet environment, the players can access the gaming system from remote locations.

The Internet, which originally came about in the late 1960s, is a computer network made up of many smaller networks spanning the entire globe. The host computers or networks of computers on the Internet allow public access to databases containing information in numerous areas of expertise. Hosts are sponsored by a wide range of entities including universities, government organizations, commercial enterprises and individuals.

Internet information is made available to the public through servers running on an Internet host. The servers make documents or other files available to those accessing the host site. Such files can be stored in databases and on storage media such as, for example, optical or magnetic storage devices, preferably local to the host.

Networking protocols can be used to facilitate communications between the host and a requesting client. TCP/IP (Transmission Control Protocol/Internet Protocol) is one such networking protocol. Computers on a TCP/IP network utilize unique ID codes, allowing each computer or host on the Internet to be uniquely identified. Such codes can include an IP (Internet Protocol) number or address, and corresponding network and computer names.

Created in 1991, the World-Wide Web (Web) provides access to information on the Internet, allowing a user to navigate Internet resources intuitively, without IP addresses or other specialized knowledge. The Web comprises hundreds of thousands of interconnected "pages", or documents, which can be displayed on a user's computer monitor. The Web pages are provided by hosts running special servers. Software that runs these Web servers is relatively simple and is available on a wide range of computer platforms including PC's. Equally available is Web browser software, used to display Web pages as well as traditional non-Web files on the user's system.

The Web is based on the concept of hypertext and a transfer method known as "HTTP" (Hypertext Transfer Protocol). HTTP is designed to run primarily over TCP/IP and uses the standard Internet setup, where a server issues the data and a client displays or processes it. One format for information transfer is to create documents using Hypertext Markup Language (HTML). HTML pages are made up of standard text as well as formatting codes indicating how to display the page. The browser reads these codes to display the page.

Each Web page may contain pictures and sounds in addition to text. Associated with certain text, pictures or sounds are connections, known as hypertext links, to other pages within the same server or even on other computers within the Internet. For example, links may appear as underlined or highlighted words or phrases. Each link is directed to a web page by using a special name called a URL (Uniform Resource Locator). URLs enable the browser to go directly to the associated file, even if it is on another Web server.

The invention is described herein in terms of this example environment and the example application in this example environment. Description in these terms is provided for ease of discussion only. After reading the description herein, it will become apparent to one of ordinary skill in the art that the present invention can be implemented in any of a number of different computing environments.

3. Automated Gaming

Having thus described an example environment in which one or more aspects of the invention can be implemented, various embodiments of the invention are now described. FIG. 1 is a functional block diagram generally illustrating functionality of the automated gaming system according to one embodiment of the invention. As stated, FIG. 1 is a functional block diagram and should not be interpreted to limit or dictate a particular structure or architecture for implementing an automated gaming system according to the invention. Indeed, after reading this description, one of ordinary skill in the art will understand how to implement one or more aspects of the invention using a number of alternative structures, architectures, or configurations.

Referring now to FIG. 1, the automated gaming system includes a gaming server 104, gaming related data 108, 112, and external interfaces 114, 116. Gaming server 104, which can include one or more computer-based server systems, provides the primary functionality for the automated gaming system of the present invention. In one embodiment, gaming server 104 executes or runs one or more software programs or modules utilized in carrying out the functionality associated with the automated gaming system. This functionality is described in more detail below in the remaining sections of this document.

The gaming data associated with or utilized by the automated gaming system can include both player data 112 as well as game data 108. Game data 108 can include data or other information pertaining to one or more games or events executed by or provided by the automated gaming system. For example, game data 108 can include game-specific rules, attributes of one or more games (e.g., competitors in the games, point spreads, payoff amounts, or other attributes associated with a game, activity, contest or other event), and other game-related data as described in more detail below.

Player data 112 can include data associated with or pertaining to one or more players 118 who access the automated gaming system to wager on one or more games or otherwise participate in the activities offered by gaming server 104. Player data 112 can include, for example, player account information, account balances, player profiles, player participation histories, and other pertinent or relevant data. Setting up the player accounts, player profiles, and other player information is described in more detail in this document below.

Interfaces to gaming server 104 can include, for example, a player interface and an administrative interface 116. Player interface 114 provides an interface by which one or more players 118 can access gaming server 104 to browse the information available by gaming server 104, or to participate in activities offered by gaming server 104. For example, in embodiments where gaming server 104 hosts wagering on sporting events, public events, or other games, players 118 can access gaming server 104 via player interface 114 to place desired wagers on one or more competitors in a chosen game.

In an embodiment implemented in the example environment described above, players 118 can access gaming server 104, via the Internet. In such an Internet embodiment, player interface 114 can comprise the "front end" of the automated gaming system that provides information and data-entry screens to the one or more players 118 accessing gaming server 104.

An additional interface included in the example illustrated in FIG. 1 is an administrative interface 116. Administrative interface 116 can be included to allow an administrator or other authorized individual to set up or alter gaming server 104. This can include the entry of specific games into the system, setting up game attributes such as identification of competitors in a game, payoff amounts, point spread amounts, payoff scales, maximum wagers, maximum acceptable loss, or other attributes that may be associated with one or more games.

As previously mentioned, this description with reference to FIG. 1 is provided to generally outline functionality associated with one or more aspects of the automated gaming system, and not to limit the automated gaming system to a particular physical or logical architecture or configuration.

System Operation

Figure 2:
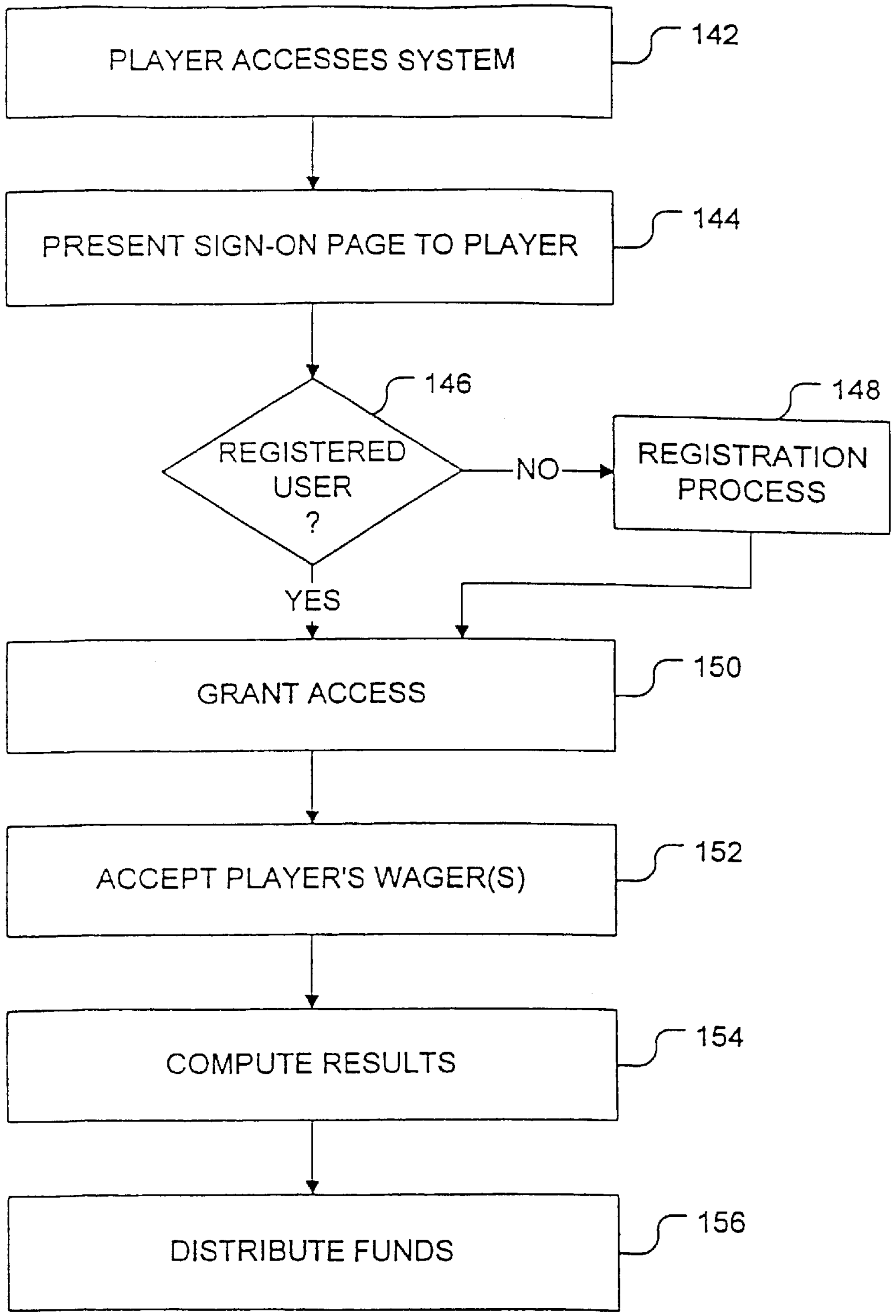
FIG. 2 is an operational flow diagram illustrating an overall process for granting access to a player and accepting a player's wagers according to one embodiment of the invention.

Having thus described functionality associated with one or more aspects of the invention in general terms, basic operation of the automated gaming system is now described. FIG. 2 is an operational flow diagram illustrating an overall process for granting access to a player and accepting a player's wagers according to one embodiment of the invention. Referring now to FIG. 2, in a step 142, a player (which can also include potential but not actual players) accesses the automated gaming system. In the example Internet environment described above, this access can be accomplished by the player accessing the appropriate Website associated with the automated gaming system.

Depending on the implementation of the system, the automated gaming system can have associated therewith one or more Websites that provide access to one or more players, such that those players 118 can participate in the activities offered by the automated gaming system. Of course, alternative embodiments can be implemented including, for example, access via local- or wide-area networks, dial-up access, direct connection, or other connectivity techniques.

In a step 144, the automated gaming system presents a sign-on page to the player who is accessing the system. This can be thought of and even implemented as the equivalent to a log-on screen whereby a computer user is asked to enter his or her log-on information to access the system. In one embodiment, the sign-on page requests that the user enter his or her user name and designated password. In one further embodiment, the password entry can be duplicated such that a new user accessing the system for a first time to establish an account can enter his or her password twice to ensure that it has been accurately entered.

In some embodiments, the system may recognize the address (IP address or otherwise) from which the player is accessing the system can be used to identify the particular player 118 and either bypass the entry screen to put the player directly into the system, or provide the entry screen with the appropriate user name and requesting only the password information. Of course, numerous alternative embodiments for granting access to an on-line or other computer-based system can be implemented.

In a step 146, in one embodiment the automated gaming system can check to determine whether an accessing player is a registered user of the system. If not, the system preferably refers, the accessing player 118 to a registration process whereby that player 118 can become a registered user of the system. For example, in one embodiment, the registration process can ask for the player 118 to provide detailed information about himself or herself, thereby allowing the automated gaming system to create a player profile for that particular player 118. The information requested can include, for example, the player name, address, phone number, and other registration-related information.

The amount and type of information requested in the registration process can vary depending on the implementation of the system. Numerous alternatives can be provided at this stage to request as little or as much information as the system designers may request or desire to receive from their players 118. For example, the system may request or provide the player 118 with the option of providing credit card or other account information during the registration process. In this scenario, the player's account can be funded or paid relatively automatically based on information in the player's profile without the player 118 needing to re-enter this information.

As another example, in the registration process the system may present the user with options allowing the player to identify certain games or other events about which he or she would like to receive notice. That is, in this example, the player's profile may include information as to upcoming contests or events such that the system automatically notifies the player when the event is available through the system and wagering is opened.

As yet another example, the automated gaming system may request information from the user such as his or her age, and location, to ensure that the player is not violating any laws or regulations by participating in certain gaming events. The system can additionally request verification of the information provided to ensure that the player is eligible to participate. Of course, as these examples serve to illustrate, there are numerous features and aspects that can be included in the registration process depending on the implementation of the system. Additionally, aspects and features tracked through a player profile can be selected by the player after the sign-on process, simply by the player accessing and updating his or her profile. The registration process is illustrated in a step 148.

As part of the registration process, the player can be asked to provide information about himself or herself including, for example, identification information, payment information, and demographic information, and the like. The level and extent of information requested could vary depending on the implementation of the system and the amount of information desired from the players. For example, demographic or other additional information may be useful in plotting trends in the activities of various players.

Of course, payment information is desirable in that it enables the system to obtain payment from the player for his or her wagers. In one embodiment, the system is implemented to set up a user account, preferably one account for each player. The payment information can be used to fund the player's account to thereby provide an account balance from which payment for various wagers can be drawn. In one embodiment, the account is established in advance, and the player is asked to fund his or her account before he or she is allowed to place wagers using the system. In funding the account, the player can render payment via check, credit card, wire transfer, or numerous other payment techniques. In one embodiment, the account funds are not available to the player for wagers until those funds have cleared the payment process. In the case of credit cards, the transaction can be authorized relatively quickly, and thus the funds made available to the player for wagering purposes almost instantaneously.

As the player makes wagers, the amount of the wager can be deducted from the player's account, thus ensuring that the system (or 'house') is covered for the wager. In one embodiment, if there are insufficient funds in the player's account to cover the wager, the player can be given the opportunity to update or replenish his or her account at that time. Additionally, in one embodiment, the player can be given the opportunity to set up his or her account such that payment to cover excess wagers is automatically accounted for in the event of such an occurrence. For example, in establishing his or her account profile, the player may provide a credit card number and authorize the system to charge that credit card account in the event that the player places a wager of an amount that exceeds his or her account balance. In one embodiment, the player can be given the opportunity to establish the account such that these transactions can occur automatically, or semi-automatically in that they require pre-approval of the player.

Once the user has registered in step 148, or if in step 146 it is determined that the player 118 is a registered user, the automated gaming system grants access to that player 118 to the gaming site. Preferably, in one embodiment, when access is granted, the player 118 is provided with a menu or other presentation of options allowing the player 118 to enter various areas of the automated gaming system. For example, the player 118 may be allowed to access his or her account information, view games or other events active on the system, or access other areas. In one embodiment, the account information can be automatically provided at the initial log-in phase, for example, as a pop-up window, giving the player 118 a summary of his or her current account status.

As stated, once granted access to the site, player 118 can browse among the various events and games currently available on the automated gaming system. Player 118 may view games and the attributes associated therewith and decide to place a wager on one or more competitors participating in one or more of the games. For example, one game available through the automated gaming system might include a basketball game between two contestants or competitors such as Duke and UCLA. The information may show a point spread, minimum and maximum wagers, payoff amounts and other information. Player 118 can decide whether he or she wishes to place a wager on one of the competitors (e.g., Duke or UCLA) in the game.

As another example, player 118 may elect to place a wager on the finishing position of Michael Andretti in an upcoming auto-racing event, or the success of Bill Koch in an America's Cup Challenge. Of course, the games are not limited to sports or sports-related events, but can include other "contests" including polls, outcomes of jury trials, results of impeachment hearings, or other happenings for which the outcome may have a level of uncertainty, or for which more than one outcome is possible.

Once the player has had the opportunity to browse one or more games and decide to place a wager, the automated gaming system accepts the player's wager or wagers in a step 152. In one embodiment, in accepting the wager, the automated gaming system updates other information in the system, including, where applicable or appropriate, updating the payoff, moving a line, recalculating maximum exposure of the system, and updating player information.

Upon completion of a game, and preferably after the results have been verified, the automated gaming system computes the payoffs to the various wagerers, and provides those payoffs to the appropriate player's accounts. This is illustrated by steps 154 and 156. The automated gaming system can also update its own accounting records to include profits or losses to the gaming system as a result of the event. Of course, additional accounting or other information can be calculated and computed at the close of one or more games.

As briefly introduced above, the automated gaming system in one aspect provides information about games to the accessing players 118. As also indicated above but not explicitly stated, the games supported by the automated gaming system are not limited to traditional sporting events or activities. Instead, the games for which automated gaming system supports wagering or other contests, can also include other events for which the outcome may be somewhat uncertain and therefore a wagerable event. For example, such events might include weather events (whether or not it rains on a particular day, the amount of snowfall brought by a particular storm, the strength of the winds of a particular hurricane, or other weather events), political events (e.g., election results, polling results, results of House or Senate votes, and so forth), legal events (e.g., trial outcome, sentencing outcomes, and the like), polling events, and others.

Figure 3:
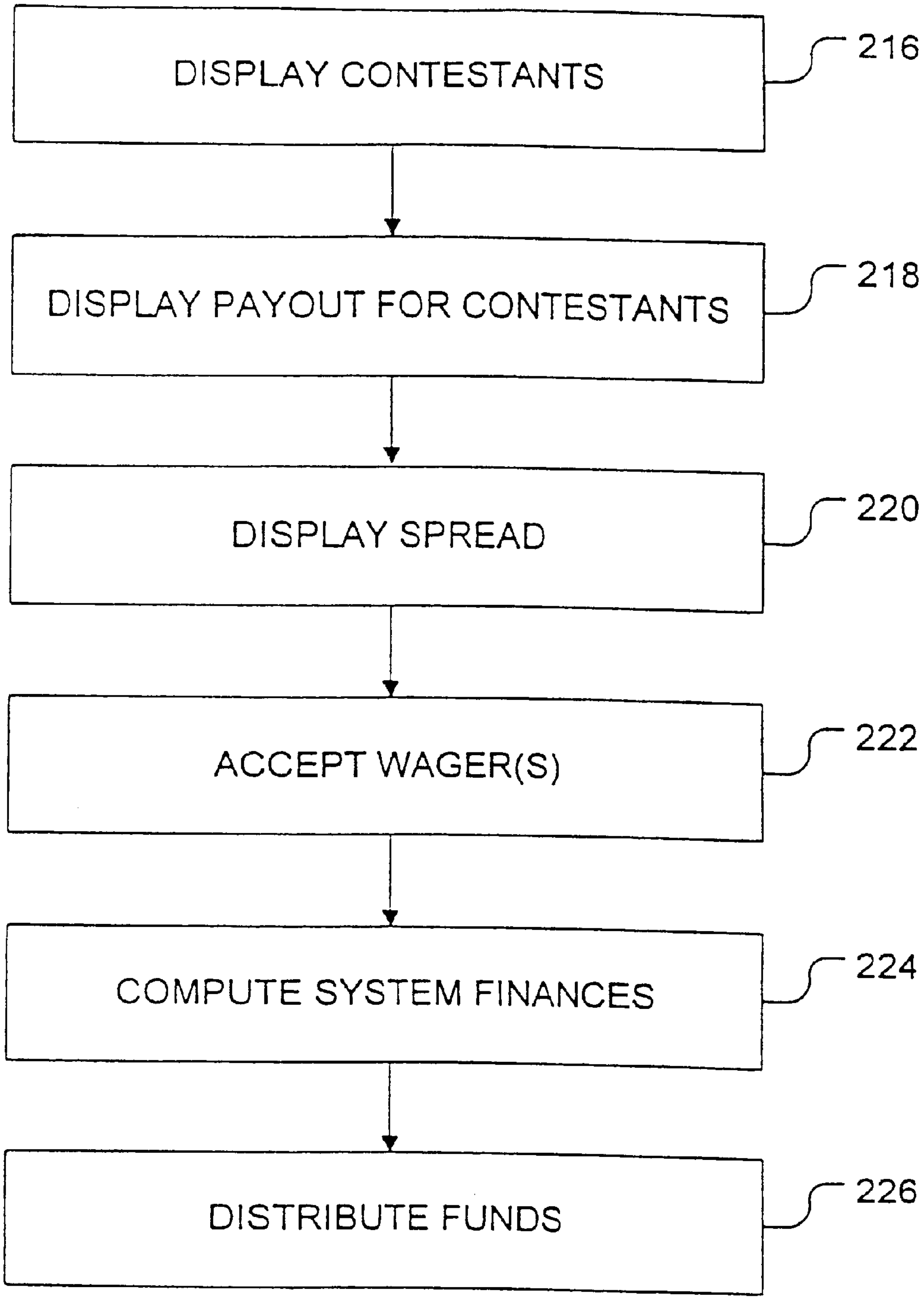
FIG. 3 is a diagram illustrating a process for displaying the games and accepting wagers according to one embodiment of the invention.

FIG. 3 is a diagram illustrating a process for displaying the games and accepting wagers according to one embodiment of the invention. Referring now to FIG. 3, in a step 216, competitors or other participants of a game or games are displayed. For example, in case of sporting events, the teams or individuals competing in the events are displayed for each event. For example, for a basketball game, a competitor is displayed for a traditional wagering situation may be a two teams competing in that particular game, for an automobile race, the display may comprise a list of cars or drivers running in the designated race, for an election, the competitors may be the nominees running in that particular election.

Regardless of the particular type of event then, the various competitors or participants in that event can be listed. Of course, access to this information can be obtained via a number of different routes, again depending upon system configuration. For example, the hierarchy of the automated gaming system may be established such that the particular games are organized according to type of game. An example hierarchy may include at a top level, sporting events, political events, weather events, and so on. The next level under sporting events may include a listing of the different sports supported by the system such as, for example, baseball, football, basketball, and so on. Under basketball (which can, of course, be further divided into high school, college, professional, and so on) a listing of the specific games for which wagering is accepted can be provided.

Additionally, search features can be included with the automated gaming system to allow a player 118 to more directly access a specific event by entering search terms such as, for example, a team name, a player name, or other key word information.

Also displayed with the competitors or participants in a particular game, are the payoffs (or odds) and spread associated with the particular game. This is illustrated by steps 218 and 220. As discussed below in particular gaming embodiments, payoff and spread information may vary during the wagering process depending on wagering activities and the gaming format. Also, it is not essential that a spread be provided for every game.

With this information at hand, player 118 can determine whether he or she wishes to place a wager on a particular competitor in a game and how much that wager should be. Also, player 118 can decide not to place a wager but instead defer that decision or continue browsing among different games for which wagers are being accepted by the automated gaming system.

In one embodiment, a "button" or other icon can be provided and associated with each competitor in a game for which wagers can be accepted. The player can make a wager by simply clicking on the appropriate button. In alternative embodiments, command language can be used by the player 118 to select a competitor on which to wager. In a preferred embodiment, once a competitor has been selected by a player 118, the system asks the player for the amount that he or she wishes to wager. As stated above, the system can establish minimum and maximum wagers depending on the desires of the administrator and depending on the system implementation.

In a step 222, the automated gaming system accepts the wager from the player 118. The automated gaming system in one embodiment first checks the player's account to ensure that the player has enough balance in his or her account to support the requested wager. The system can debit that account for the amount wagered or place a mark on the amount of funds wagered from that account such that those funds are not available for other wagers until the results of that particular wager are known. Thus, this safeguard ensures that a player 118 will not wager more than he or she has in his or her account on one or more games.

In one embodiment, if there are insufficient funds in the account to support the wager, the automated gaming system can prompt the player 118 to replenish or enhance his or her account to make up for the lack of funds. Alternatively, the automated gaming system can ask that player 118 to adjust his or her wager to fall within the amount available in his or her account.

In one embodiment, account updating can be performed automatically where a player attempts to wager more than he or she has in his or her account. The level of automation in this process can be selected, depending on the system implementation. For example, a totally automated process can be provided whereby the player's account is updated independently of, or without the intervention of, the player. However, in a preferred embodiment, player 118 is as least notified that his or her credit card will be charged for the additional funds and allowed to approve or disapprove the additional charge and thus proceed or not proceed with the designated wager. Additionally, the player's profile may provide instructions as to how the automated gaming system should proceed in such a situation. This option allows automated handling of the event yet provides handling according to an individual player's requests.

In a step 224, once the wagers are accepted, financial information for the game is computed. For example, the system can compute the amount wagered for each competitor on a cumulative basis and perform other computations or decisions as deemed by the system implementation. For example, a system may recalculate odds, recalculate payoffs, adjust spreads, or make other computations and decisions based on the amounts wagered as of that time.

In a step 226, the displays of the games or game information are updated to reflect any changes made as a result of the last wager or wagers. Although any of a number of gaming formats are compatible with the current system, two formats are described herein in detail below. These are a pari-mutuel format and a guaranteed-payout format.

With pari-mutuel betting, the payout typically changes while betting is opened or active on the game. Conventionally speaking, pari-mutuel betting is often seen in horse racing where the payoff for a particular horse to win, place, or show changes depending on the amounts bet on the contestants in the field. The automated gaming system can be used to implement a pari-mutuel betting as well. However, with the automated gaming system, pari-mutuel betting is not limited to horse racing or related events, but can be used in conjunction with other games including team sports, political events, weather events, and others. Additionally, the automated gaming system allows additional features or aspects to be included with pari-mutuel wagering that are not found in conventional pari-mutuel settings.

With a guaranteed-payout format, the player can make a wager and "lock-in" his or her payout amount should the team on which he or she wagered win (or at least beat the spread). In one implementation of guaranteed-payout betting, the system can adjust the guaranteed payout amount for subsequent wagers to help balance the system and reduce system exposure. To some extent, in this embodiment, the change in the guaranteed payout amount for subsequent wagers can be viewed as effectively attempting to change the opinion of the betting public to keep the wagering system balanced to avoid or minimize potential losses by the automated gaming system.

Pari-mutuel, guaranteed-payout, and other gaming formats are described in conjunction with the automatic gaming server in detail below. After reading this description, it will become apparent to one or ordinary skill in the art that the automated gaming server is not limited to posting gaming in these two formats.

Pari-Mutuel Betting System

As discussed above, any of several different gaming formats can be provided using the automated gaming system. One such betting format is a pari-mutuel type of betting format that is supported by the system. According to the pari-mutuel format, payoff amounts for wagers made by a player on a particular competitor are displayed to the player at the time the wager is made or contemplated. However, this particular payoff amount is not guaranteed under the pari-mutuel system, but can change depending on the wagering activity for that particular game or event.

For example, the betting period may open with particular payouts published for the various competitors or a particular game. The payouts can be displayed in any of a number of formats, one of which being the amount of the payoff per the dollar wagered. As time progresses throughout the betting period, wagers coming in may more heavily favor one competitor over the other competitor(s). If this is the case, the pari-mutuel format can alter the payout amounts to entice wagerers to the other side (or to the other competitors). Additionally, in one embodiment, the automated gaming system can take other steps that may help to minimize the exposure, should a heavily wagered competitor win the contest.

Figure 4:
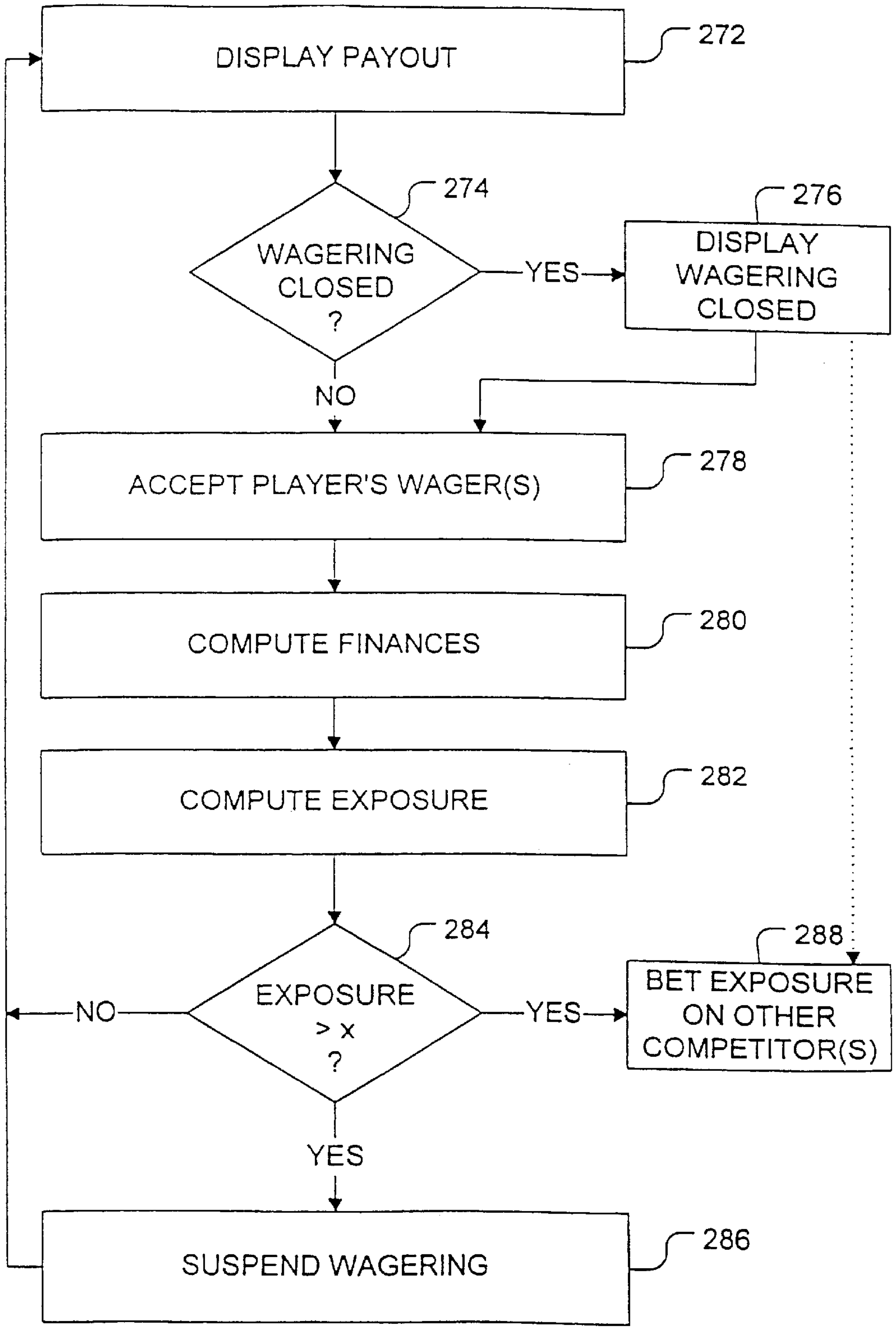
FIG. 4 is an operational flow diagram illustrating a process for implementing a pari-mutuel gaming format according to one embodiment of the invention.

FIG. 4 is an operational flow diagram illustrating a process for implementing a pari-mutuel gaming format according to one embodiment of the invention. Referring now to FIG. 4, in a step 272 payout and perhaps other information for a game are displayed to a player 118. Preferably, the payout amount displayed is the current amount of payout based on the wagering history as briefly described above. This is the information available to player 118 when he or she is deciding whether to place a wager and how much to wager.

In one embodiment a calculator can also be displayed or made available to the player 118 so that he or she can calculate the amount of payoff for a particular dollar amount he or she is considering betting. In one implementation, the calculator can be somewhat automated, in that the only variable player 118 needs to enter is the amount of the wager he or she is considering. The odds and calculation can occur automatically.

Because in one embodiment, the betting or wagering period can be closed at a predetermined time prior to the start of the game or event, the automated gaming system can first determine whether the betting period has closed prior to accepting any more wagers. If the betting period has closed, the automated gaming system informs potential players 118 that the betting for this particular event has closed. This can be accomplished, for example, by removing the bet buttons or icons from the screen, disabling their functionality, blackening them out, displaying a red bar over them, displaying a message that the betting has closed, or by any of a number of techniques intended to portray the message to the potential player 118. This is illustrated by steps 274 and 276.

If the betting has not closed, player 118 is permitted to make a wager and provided that the wager is within minimum and maximum bounds that may be established for the system, and further provided that player 118 has sufficient balance in his or her account, in as step 278 the automated gaming system accepts the wager. In a step 280, the automated gaming system re-computes the finances for that particular event based on the subject wager.

In one embodiment, the finances are computed and updated after each wager such that the recomputed payouts can be displayed and made available for the next wagerers to place a wager in the system.

In re-computing the finances, the automated gaming system can calculate the cumulative finances wagered on each side or for each competitor of the event and the payouts for each competitor should that competitor win. Also, the automated gaming system in re-computing the finances can properly debit, earmark, or otherwise attach the player's account such that those funds can be committed to the wager that was made by player 118.

In a step 282, the automated gaming system computes its "exposure" in the particular event. That is, the automated gaming system looks at the potential payout that it would have to make should a competitor win and determines the extent to which that payout is not covered by wagers on the event. Exposure is particularly important in an implementation where the system provides a guaranteed minimum payout should a competitor win. That is, in one or more embodiments, it is contemplated that the system may be implemented to provide a guaranteed payout of, for example, 5 or 10%, or other minimum, to wagerers on the winning side, even if there are not enough wagers on the other side(s) to cover this guaranteed minimum. Thus, in this situation, the automated gaming system has an exposure that is equal to at least the amount of the uncovered minimum. One technique for calculating the exposure is to total all of the wagers made on a competitor that has the heaviest betting, calculate the guaranteed payout and subtract from that calculation the total of all of the bets that were made on the other competitors. If this amount is greater than zero, this indicates the exposure faced by the automated gaming system.

In the embodiment illustrated in FIG. 4, if the exposure is above a certain predefined amount, the wagering on that contestant can be suspended while an imbalance in the system remains. Thus, when the system determines that a payoff of the minimum payout amount will exceed a predetermined loss limit, wagering on that contestant can be temporarily suspended and may be reopened should the imbalance become rectified by subsequent wagers on the other competitor or competitors.

This is illustrated by steps 284 and 286. Alternatively, if the exposure is not above a predefined amount, or in other words, are within an acceptable level, the betting will not be suspended.

In one embodiment, if the exposure is above a certain predetermined amount, the payout amounts can also be adjusted to entice players 118 to wager on the underdog (e.g., under-wagered) competitors.

Additionally, one aspect of the automated gaming system is that it allows spread betting to be implemented even in this pari-mutuel format. That is, spread betting can implemented alone, or in combination with pari-mutuel format for additional flexibility. In this scenario the payout amounts can be adjusted, the spread adjusted, or wagering suspended, alone or in combination, to attempt to reduce system exposure.

Also illustrated in FIG. 4 is a technique for helping to minimize or reduce system losses due to exposure. In this embodiment, as illustrated by step 288, once the betting has closed, the amount of exposure if the "favored" side should emerge victorious (or at least beat the spread) is bet on the underdog (or under-wagered) side. This has the effect that should the under-wagered side win, the automated gaming system can share in the profits associated with those winnings. This positive cash flow can then offset losses that may occur in other scenarios where the heavily wagered side wins.

Figure 5:
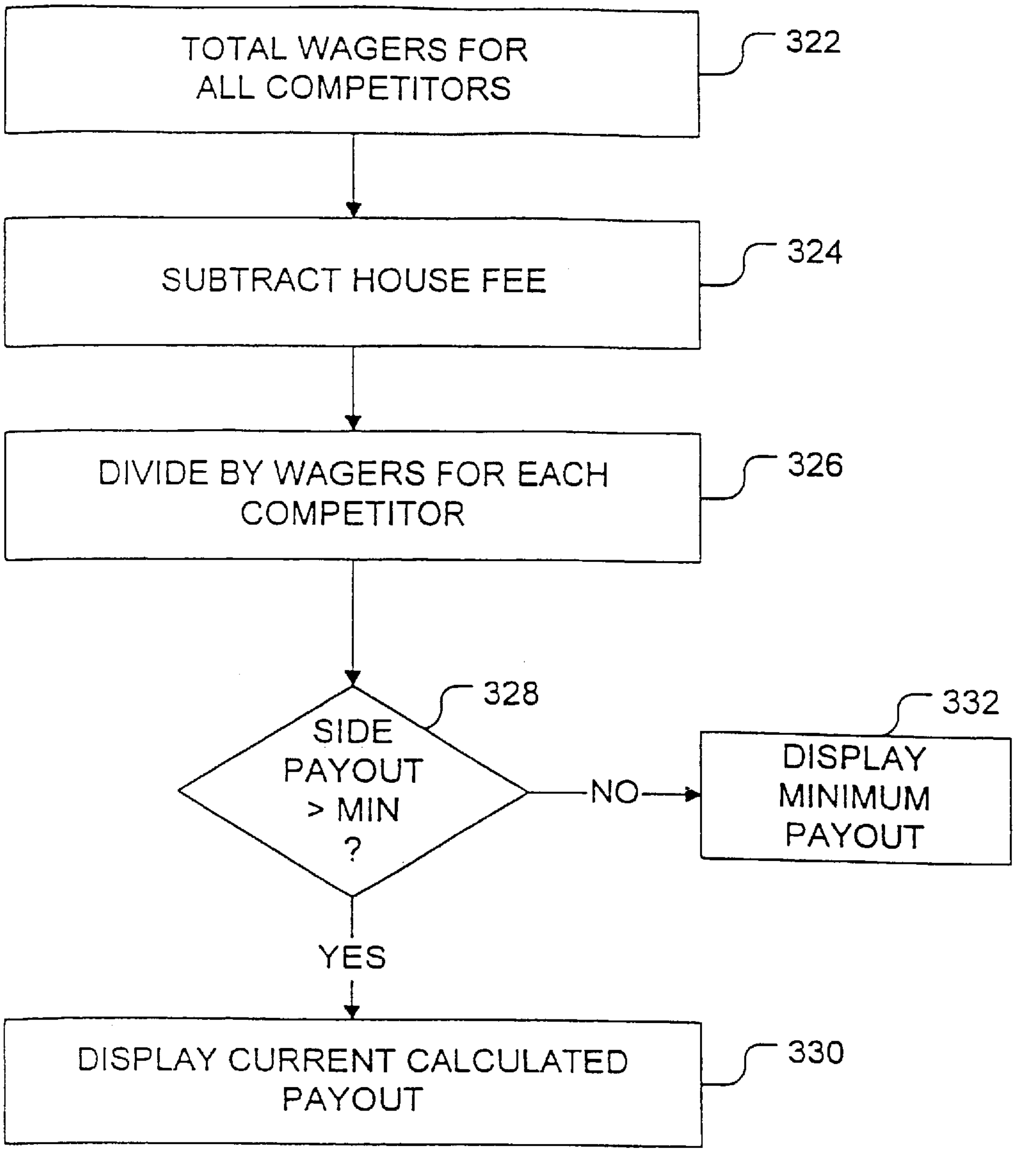
FIG. 5 is an operational flow diagram illustrating a process for calculating the payoff for a wager according to one embodiment of the invention.

FIG. 5 is an operational flow diagram illustrating a process for calculating the payoff for a wager according to one embodiment of the invention. In a step 322, the system adds the wagers for all competitors of a given event. That is, the total amount of funds wagered on each side, or for each competitor in a game or other event, are totaled. In implementations where a VIG or house fee is charged to players 118, this fee is subtracted in a step 324. The remaining amount then is the amount available for distribution among the players 118 who selected the winning competitor. Thus, in a step 326, the system divides the funds to be distributed by the number of wagered dollars for each competitor. This number provides the actual payout for that competitor.

For example, consider a simple situation where various players 118 have cumulatively wagered $50 worth of wagers on side A and $100 worth of wagers on side B. In this situation, the total amount available for payout is $150. Assuming for the sake of simplification that there is no house fee, this $150 then is distributed to the wagerers on the winning side on a pro-rata share. That is, for each dollar wager on side B, the payout would be $1.50. For each dollar wager on side A, the payout would be $3.00. Of course, this amount would be somewhat less where a house fee is involved.

Having calculated the payout, the system determines whether the payout is above the minimum payout designated for that event. If so, the current payout is displayed as calculated. This is illustrated by steps 328 and 330. If, however, the payout is less than the minimum promised, the minimum guaranteed payout is displayed as illustrated by steps 328 and 332. As another example, consider a scenario where $1.00 is wagered on side A and $100 is wagered on side B. Should side B emerge victorious, the payout would be 1.01 for each dollar wagered on side B, representing a 101% payout. In one embodiment, the system can implement a guaranteed minimum as stated. For example, a 5% minimum may be established, wherein each dollar wagered is guaranteed a minimum payback of $1.05 should that competitor be victorious. Thus, in this scenario, the system exposure would be 4¢ per dollar bet or $4.00.

Of course, in computing the exposure to the system, the exposure can be determined with or without considering the associated house fee. For example, in one embodiment, exposure can be calculated assuming that in this worst-case scenario there is no house fee, and the exposure then is purely a loss. Alternatively, the exposure can be calculated as the exposure assuming that a house fee is included in the calculations. The system can be implemented using either alternative depending upon the accounting practices desired.

One aspect of the invention is that it allows pari-mutuel format betting to be implemented for sporting events as well as other events. Pari-mutuel wagering is not longer restricted to horse racing or other conventional pari-mutuel bets. In fact, as described above, the pari-mutuel wagering format can be implemented with any of a variety of sporting events including, for example, baseball, football, hockey, or other sports events, as well as other games, events, contests, or other scenario where there is more than one possible outcome or the outcome is less than certain.

Guaranteed-Payout Gaming

As briefly introduced above, another gaming format that can be supported by the automated gaming system is a guaranteed-payout gaming format. In one embodiment of this format, the payout at the time a wager is made can be guaranteed at a particular payout amount for the player making the wager. To help the automated gaming system cover potential losses, payout amounts for subsequent wagers for one or more of the competitors in a particular event can be adjusted or re-determined after each wager or after a group of wagers.

Figure 6:
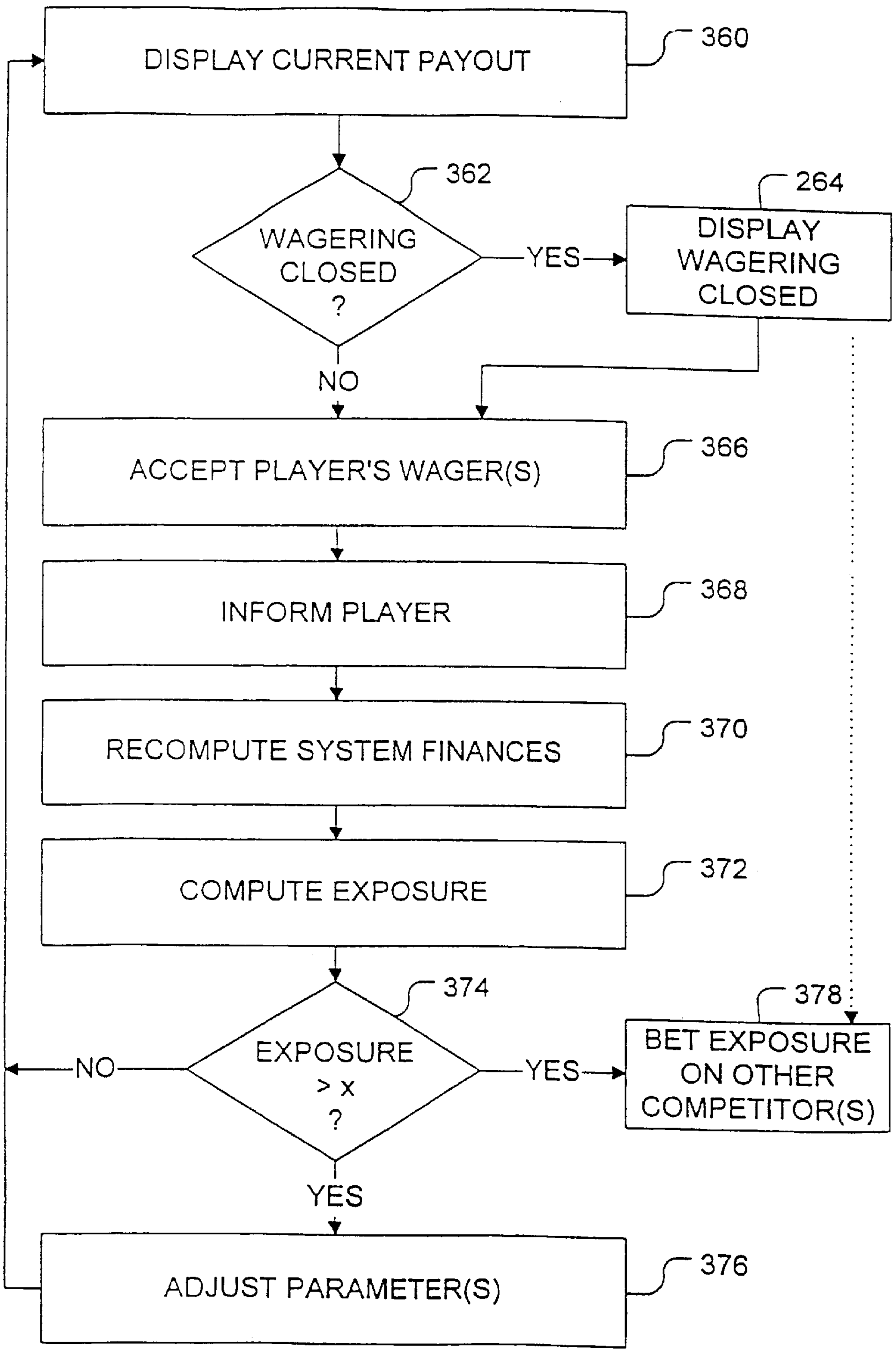
FIG. 6 is an operational flow diagram illustrating one process for accepting wagers in a guaranteed-payout format according to one embodiment of the invention.

FIG. 6 is an operational flow diagram illustrating one process for accepting wagers in a guaranteed-payout format according to one embodiment of the invention. Referring now to FIG. 6, in a step 360 the current payout for the competitors in an event is displayed to players 118. As with the pari-mutuel event, in one embodiment the wagering can be closed and the fact that wagering is closed displayed or otherwise made known to players 118 such that they cannot make subsequent wagers. This is illustrated by steps 362 and 364. However, if the wagering period is still open, in a step 366, the automated gaming system accepts wagers at the current payout.

In a step 368, when a wager is accepted, the automated gaming system informs the player that his or her wager has been accepted at the stated payout. In one embodiment as stated above, this stated payout is a guaranteed level and the player is guaranteed this payout should his or her selected competitor emerge victorious. In this embodiment, this payout level does not change regardless of subsequent betting activity by this or other players.

In a step 370, once a wager is made and accepted, the system re-computes the finances for that event. In re-computing the finances, the system can compute parameters such as amounts wagered for the various competitors in the event, payouts for each competitor, potential exposures, and so forth. In fact, as illustrated in step 372, the system computes the potential exposure should a heavily wagered competitor be successful in the event. The manner in which the exposure is computed according to one embodiment is discussed in further detail below with reference to FIG. 9.

If the exposure is greater than an acceptable minimum, one or more of the payout figures for the competitors can be adjusted as illustrated by steps 374 and 376. The payout can be adjusted for one or more of the competitors in the event and can be adjusted by predetermined amounts or an amount determined "on the fly" depending on the system implementation. Additionally, payouts can be adjusted in games where there is no spread as well as in events where there is a spread but the spread can be kept constant.

Adjusting the payouts can potentially serve two purposes: Balancing the accounting on the system to help reduce exposure, and swaying the "opinion" of potential players 118 to bring more wagers into the underdog (i.e., under-wagered) side.

Figure 7:
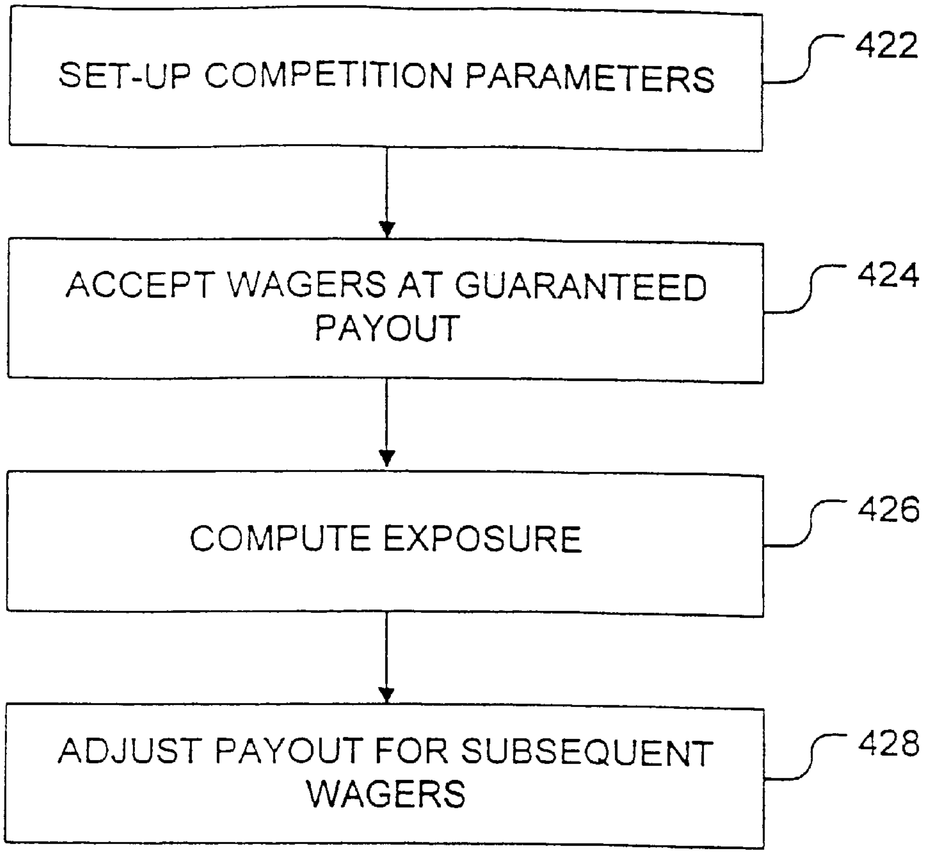
FIG. 7 is an operational flow diagram illustrating a process for accepting wagers and re-computing payouts for a guaranteed-payout system according to one embodiment of the invention.

FIG. 7 is an operational flow diagram illustrating a process for accepting wagers and re-computing payouts for a guaranteed-payout system according to one embodiment of the invention. Thus, as outlined above, for a guarantee-payout system the game parameters are established, wagers are accepted at a guaranteed payout, exposure is computed and the payout is adjusted for subsequent wagers. The game parameters can include information such as, for example, the competitors in the event, a point spread where used, payout amounts for each competitor and a sliding scale payout amount such that payouts can be adjust based on wagering activity. These steps are illustrated in FIG. 7 as steps 422, 424, 426 and 428.

Figure 8:
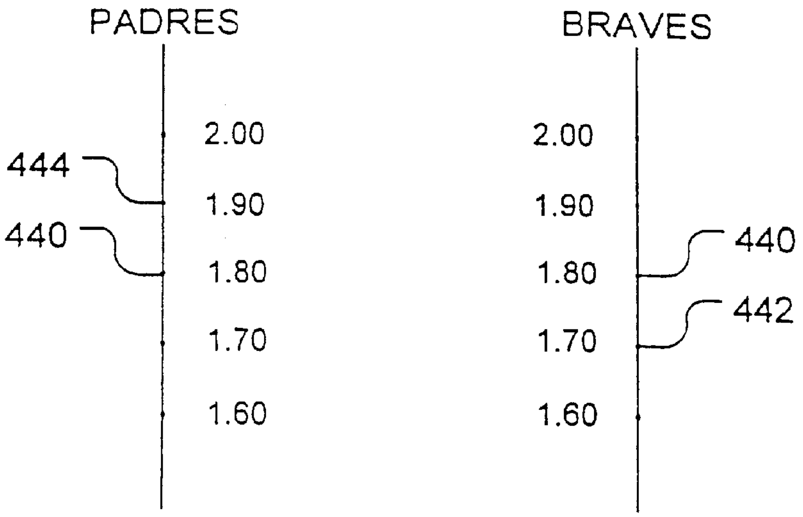
FIG. 8 is a diagram illustrating one example of sliding scales that can be implemented in a hypothetical contest according to one embodiment of the invention.

As indicated in FIG. 7, one aspect that can be implemented with a guaranteed-payout system, is that of adjusting the payout amount for subsequent wagers. In one implementation of this embodiment, sliding scales for the payouts for one or more of the competitors can be established and as wagers are made and finances computed, the payouts adjusted according to the established sliding scales. FIG. 8 is a diagram illustrating one example of sliding scales that can be implemented in a hypothetical contest according to one embodiment of the invention.

Referring now to FIG. 8, an example scale is set up for a hypothetical game between the Padres and the Braves. Because the teams are considered relatively even in this hypothetical contest, there is no point spread. Additionally, because it is anticipated that betting will be somewhat even on each side, initial payout for each team is set at $1.80 for each dollar bet on each team. This initial payout amount is illustrated by referenced numeral 440. In this scenario then, as each wager is made for the Padres or the Braves, the payout for this wager can be guaranteed at $1.80 for each dollar wagered.

In operation, the system continues to compute the finances for the game to determine when the exposure reaches a given threshold or level. For example, consider a scenario where after an initial period of betting, the dollar amount of wagers made on behalf of the Braves exceeds the dollar amount of wagers made on behalf of the Padres. In this scenario, the exposure for the system should the Braves win the competition may reach an unacceptable level. As such, the system can adjust the payout by lowering the amount of payout for subsequent wagers for the Braves and raising the amount of payout for subsequent wagers to the Padres.

For example, subsequent wagers to the Braves may be paid out at a new payout level of $1.70 per wagered dollar as illustrated by reference numeral 442, and payouts for the Padres paid at $1.90 for each wagered dollar as illustrated by reference numeral 444. In this manner, the system may entice bettors to the underdog (i.e., under-wagered) side in an attempt to obtain additional funds to help pay the payout should the other side win.

The example scenario illustrates an adjustment of a heavily wagered side down and under-wagered side up, simultaneously. Of course, these exact adjustments are not necessary and alternative adjustment mechanisms can be put into place such as, for example, adjusting the sides at different times, adjusting the sides by different amounts, adjusting one side and not the other, and so on. Additionally, although no spread was indicated in this example scenario, a spread can be implemented and the spread can also be adjusted to help sway player's opinions.

It should also be noted in the above scenario that the betting for both the Padres and the Braves started out with an equal payout of $1.80 per side. Where the game is established for wagering with no spread, yet there may be a perception of imbalance between teams, the payout amounts can start off unequal to help entice wagerers to the team that is considered to be the weaker of the two competitors.

In the guaranteed-payout format, system exposure can arise in at least two different scenarios. In a first scenario, a first level exposure arises when betting or wagering on one side (versus the other side) exceeds a predetermined amount, causing the guaranteed payout system to change the money line or payoff. In one embodiment, the level of exposure is set to a relatively low threshold such that the payout amounts can be changed relatively quickly, thus helping to more quickly entice players to place wagers on the under-wagered side.

A second level of exposure can occur where the overall loss limit for the system on a particular contest is met. When this level is reached, betting can be suspended on the over-wagered side while the imbalance remains.

Figure 9:
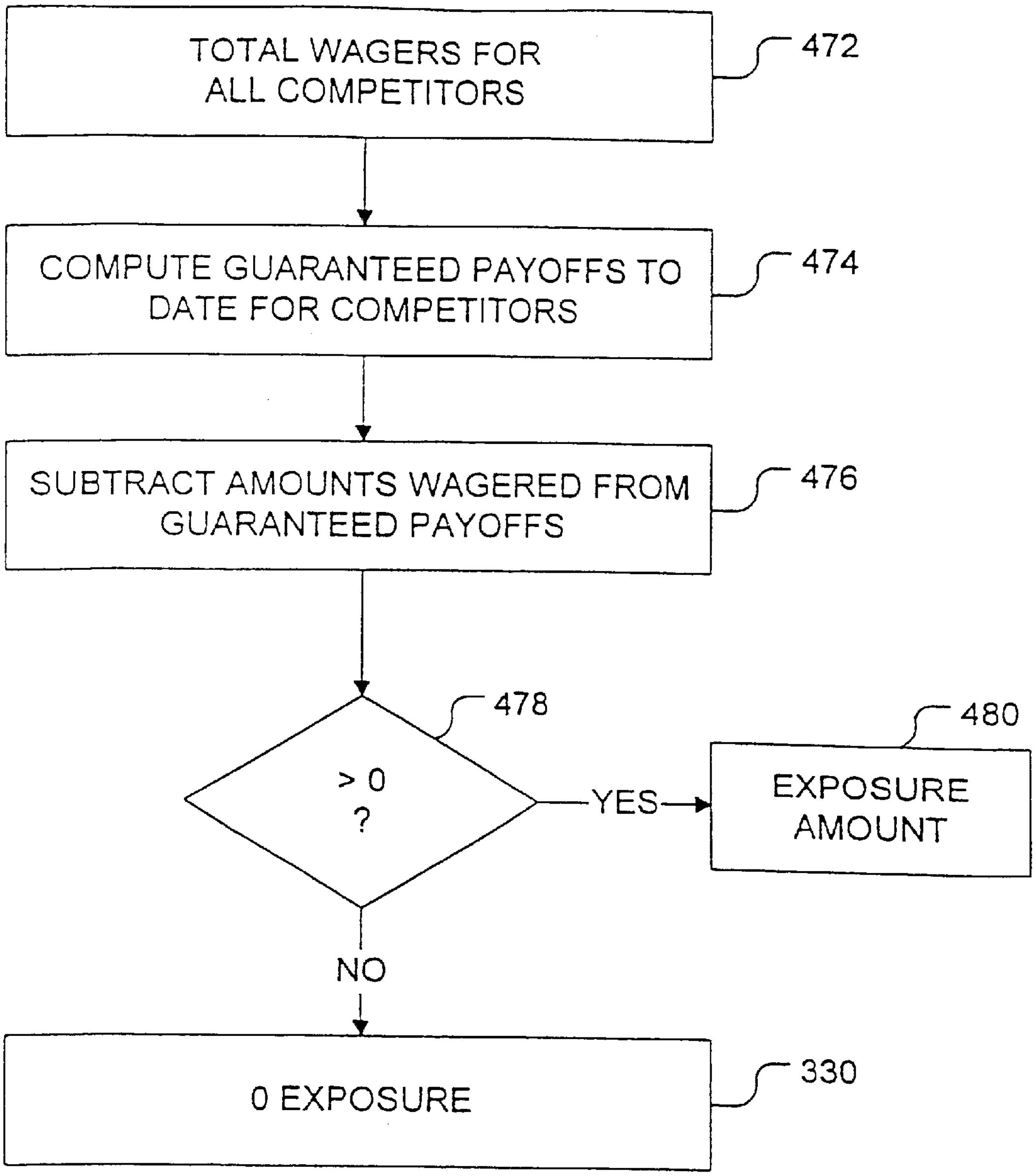
FIG. 9 is an operational flow diagram illustrating a process for computing an exposure for a guaranteed-payout format according to one embodiment of the invention.

FIG. 9 is an operational flow diagram illustrating a process for computing an exposure for a guaranteed-payout format according to one embodiment of the invention. Referring now to FIG. 9, in a step 472, the wagers made for each competitor in the competition are totaled. In a step 474, the guaranteed payouts for each of those wagers for each competitor are also determined. In one embodiment, the payouts can be determined only for the heavily-wagered competitor, because this is the side in which exposure is most likely to be present. Because the payout level is guaranteed as of the time a player makes the wager, the payout levels or payout amounts for each wager and the associated wager amount are stored and accessed for purposes of this computation. Thus, the payout amounts for the competitor is determined based on the actual payout amounts guaranteed for the wagers placed to date.

In a step 476, the total amount wagered for all other competitors is subtracted from the net payout amount for the heavily wagered competitor (less the amount wagered on that competitor) to determine whether there is enough money to make the level of guaranteed payout. If the amount is greater than zero, there is an exposure, and this excess indicates the amount of exposure. This is illustrated by steps 478 and 480. If the amount is not less than zero, there are enough funds to cover the payout and there is no exposure as illustrated by steps 478 and 482. Of course, in this and other exposure computations described in this document, the exposure is made assuming, or regardless of, overhead costs and house fees associated with the gaming.

Also worthy of mention, is a scenario where there may be multiple payouts such as, for example, in a horse racing, automobile racing or other event where there can be more than one "winner." In this instance, the maximum-payout scenario is preferably computed and used to determine the exposure based on the total amount of money wagered for the various competitors.

As stated above, the automated gaming system can be implemented in an environment where one or more networks such as, for example the Internet, or an extranet, WAN, or LAN is used to allow various players to access the system. One approach is to allow players from various remote locations to access the system via the Internet. Other approaches can be considered as well. For example, a local area network in a facility such as a hotel, motel or other guest facility can be used to bring interactive gaming into the rooms of the guest facility.

As another example, two or more gaming systems can be coupled to allow combined gaming. In one example, two gaming systems may be connected via a communication channel such as a wide area network or via an extranet, to allow gaming to be shared among the systems. In fact, in one embodiment, the wagering pools for one or more events can be shared by two or more systems to help reduce exposure. As would be apparent to one of ordinary skill in the art after reading this description, alternative connectivity strategies can be implemented.

Another aspect of the present invention includes means to ascertain and verify the physical location of the player. Such capability is desirable in instances when the player must be located within a particular geographic location, such as a country, state or city, to satisfy local, state, federal or other laws or requirements regarding participation in the gaming activities of the present invention. For example, some states allow gambling if the location of the player is within a particular state. Likewise, numerous states allow certain types of gambling if the participant is in any of several states that allow for participation in these certain types of gambling. Similar restrictions or freedoms are granted by various countries, states or cities within the states of the U.S. Advantageously, one aspect of the present invention provides a method and apparatus to verifying a location of a player and facilitate gaming via a communication link with remotely located players.

Figure 11:
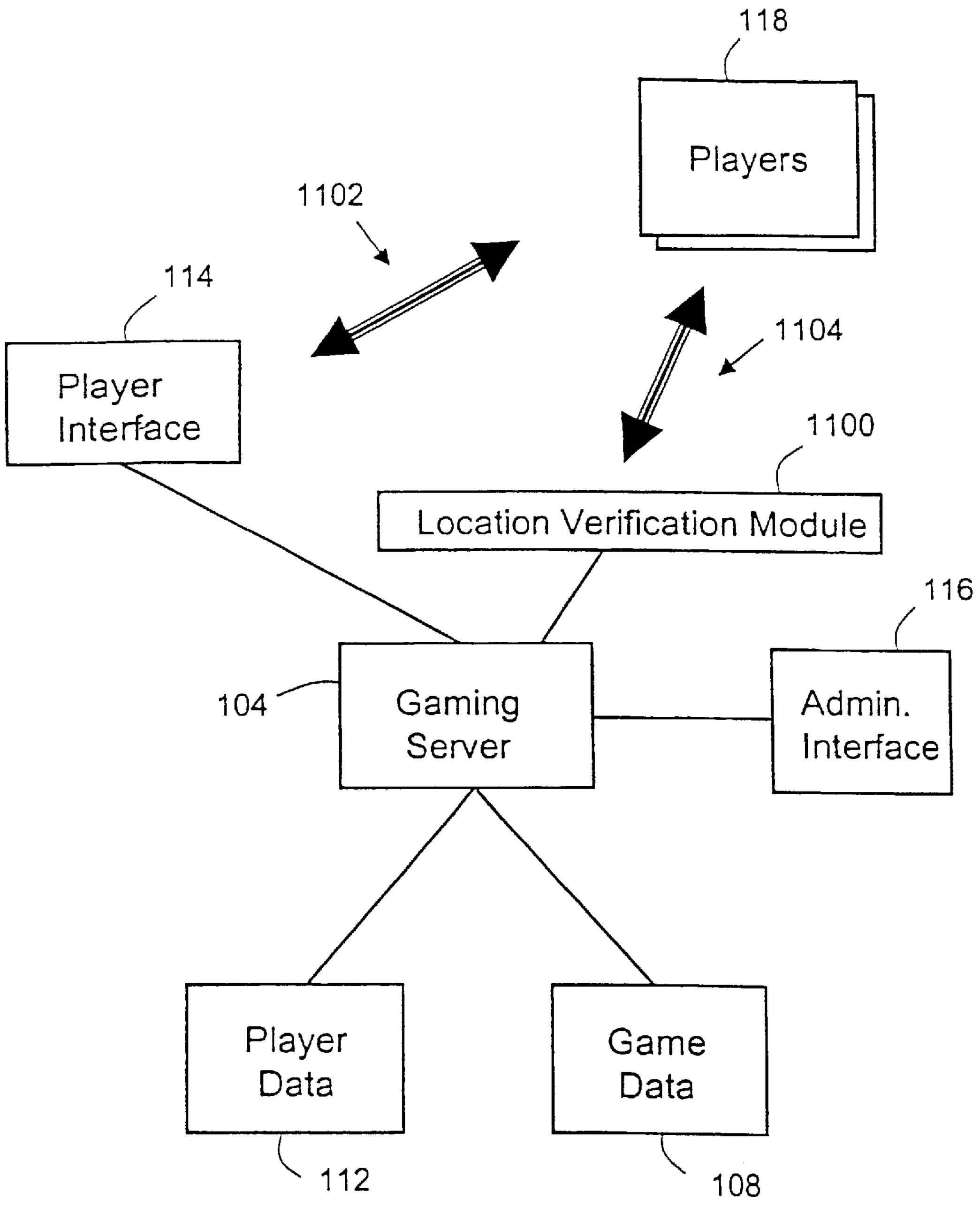
FIG. 11 illustrates a function block diagram generally illustrating the functionality of the automated gaming system with player location verification features.

FIG. 11 illustrates a functional block diagram generally illustrating the functionality of the automated gaming system with player location verification features. In reference to FIG. 1, like elements are referenced with like reference numerals. The gaming server 104 connects with the player interface 114, the player data 112, the game data 108 and the administrative interface 116. These devices operate in a manner generally consistent with detailed description above. Accordingly, a discussion of the operation of these devices is not repeated.

As described above, players 118 exchange data over a communication link 1102. In various configurations the communication link 1102 comprises two or more computers linked via the Internet, computers linked via a dedicated computer network having remote call-in access capability, telephone connections utilizing the public switched telephone network (PSTN), or other similar communication link such as direct trunk link, cellular or other form of radio transmission or any other computerized network providing communication capability between remotely located computers or terminals. Data exchanged over the player interface includes but is not limited to data regarding the player's account number, player password, gaming selections, additional details regarding a gaming selection, and units or amounts that the player desires to wager. Information which may be provided to the player from the player interface 114 and the gaming server 104 includes, but is not limited to, possible gaming selections, odds, pay-out rates, gaming start times, gaming wager close time, participation, account information, account balance and any other information that facilitates interactive wagering of the type described herein.

In addition to the apparatus shown in FIG. 1, the present embodiment or configuration includes a location verification module 1000. The location verification module 1100 communicates with the gaming server 104 and may assist in establishment of a communication link with player 118. The location verification module 1100 is a configuration of hardware and/or software designed to determine the location of a player with whom a direct communication link is being established. The location verification module includes mean for communication in the form of data exchange with the players 118 via a direct communication link 1104. Direct communication link 1104 may comprise any manner of communication link described above for communication link 1102.

The operation of the present invention is now described. In general, the present invention provides player interface via standard Internet connection 1102 while reserving actual wagering via direct communication link 1104 after player location verification.

Figure 12:
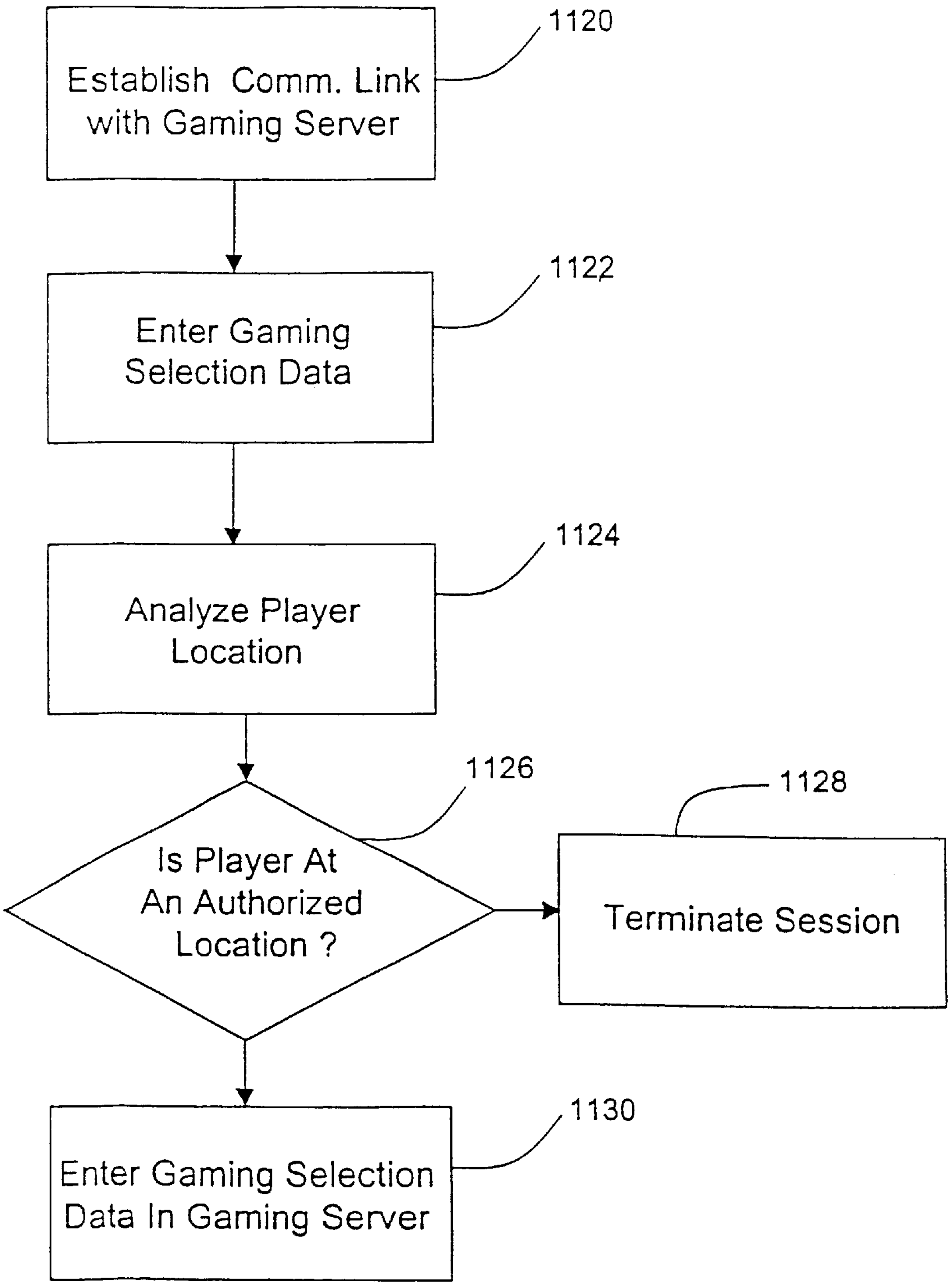
FIG. 12 illustrates an example gaming and wagering selection.

FIG. 12 illustrates an operational flow diagram illustrating an overall process for achieving player gaming with player location verification. At a step 1120 the player establishes a communication link with the gaming server via the player interface. In one embodiment the communication link between the player and the player interface is achieved using the Internet and the player interface is a page on the world wide web.

At step 1122, the player enters gaming selections from those provided via the player interface. Gaming selections may include teams, individual, animals, entities or any event on which to wager or gamble. The gaming selections may also include wager amount, odds, pay-out rates, event or contest times, wagering cut-off or closing times, and other rules or account information.

Next, after the player has entered the gaming selections, the gaming system analyzes the player location, step 1124, to determine and verify that the player is in a location from which the gaming system is configured to allow participation. For example, in various embodiments the gaming server accepts wagers from individuals located only within a particular state, such as for example Nevada. In other embodiments the gaming server is configured to only allow participation from players located in one or more states within the United States or in particular countries.

In one embodiment the gaming system determines the location of the player using ANI from the communication link. ANI (Automatic Number Identification) or caller ID, is a method of transmitting telephone caller information, such as the telephone number of the caller. In one configuration, the data is transmitted to the subscriber in the ringing phase of the telephone, i.e. during the on-hook phase, using the V.23 or BEL202 modem standard, which is an FSK-type (frequency shift key modulation) signal at 1200 bit/s. Channel seizure occurs to minimize the possibility of noise mimicking a genuine carrier signal. The channel seizure transmits 0's and 1's at the 1200 bit/s rate. In one embodiment, the length of channel seizure at the terminal device is at least 96 bits (80 ms) but generally less then 315 bits. Any other ANI method or location verification can be used.

The present Caller-ID utilizes eight parameter types. These include the call type, the time & date, the calling line directory number, and the called directory number. The calling line directory number is the number of the line from which the call was made. The called directory number is the number that was called, which is significant in determining if the call has been diverted.

Therefore, utilizing the ANI number provides one method to identify the location of the calling party or the location of the call recipient.

Next, at decision step 1126, the gaming system verifies if the player is in an authorized location. If the player is not in an authorized location the operation progresses to a step 1128 wherein the gaming system terminates the communication link.

Alternatively, if the system determines that the player is in an authorized location, the operation progresses to a step 1130 wherein the player's gaming selections are entered in the gaming server. It is at step 1130 when the wager or bet is actually made and registered with the server. Hence, the wager is only officially made after the location of the player is verified as an authorized location.

Figure 13:
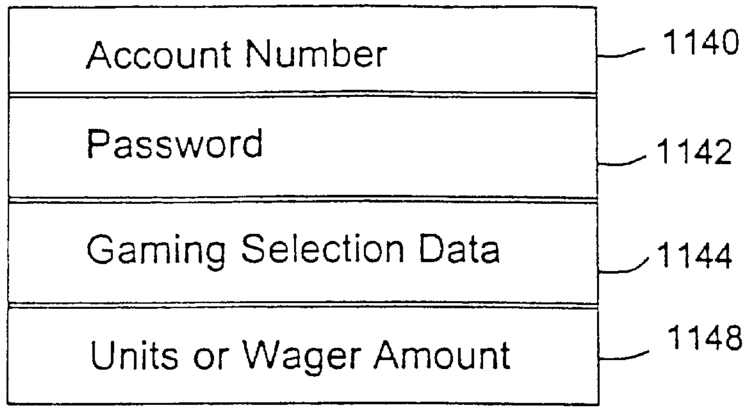
FIG. 13 illustrates an operational flow diagram of an overall process for granting access to a player and accepting a players gaming selections after verifying that the player is in an authorized location.

FIG. 13 illustrates an exemplary listing of game selection data. As shown, game data presented by a player to the gaming server may comprise a player account number 1140 and password 1142. In addition, the data may comprise gaming selection data 1144 and the units or wager amount 1148.

Figure 14:
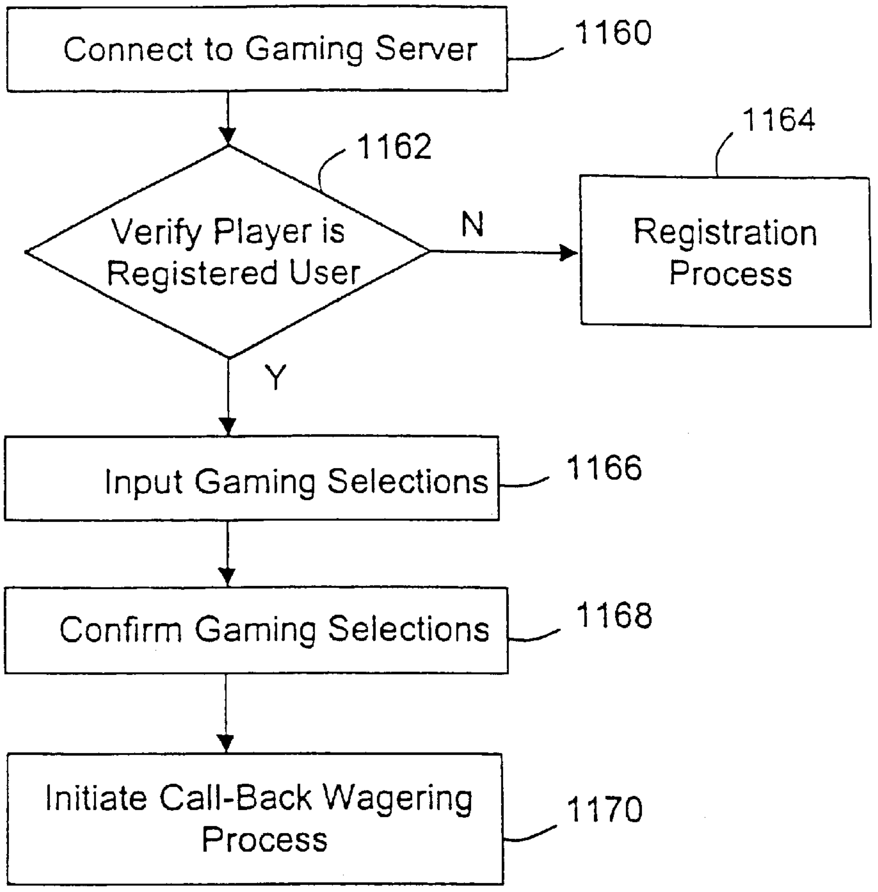
FIG. 14 illustrates a detailed operation flow diagram of a process for granting access to a player.

Turning now to FIG. 14, an operational flow diagram of an example method of operation of a location verified gaming system is shown. In one example method of operation the Internet serves as the communication link between the gaming server and the players terminal or computer over which gaming selections are made. A direct communication link between the gaming server and the player's computer or terminal, established by an automatic call-back procedure, carries the official execution instructions for wagers. Establishing a direct communication link using a call back procedure avoids use of a packet switched network that may route data packets through unknown locations. It is contemplated that in other embodiments, communication links besides that of a direct connection may be utilized.

At a step 1160 of FIG. 14, the player connects to a gaming server. In this embodiment it is contemplated that the communication with the gaming server is achieved by the player using a personal computer or similar terminal to access the gaming data located on the gaming server that is connected to the Internet or other computer network. The gaming server may optionally include a player interface such as an interactive web page to facilitate the exchange of data between the gaming server and the player. Connection to the gaming server also includes the player entering a player unique identification number or word and a password or pass number for purposes of security.

Next, at a decision step 1162, the operation compares the player identification against the list of registered players stored on the gaming server. If the player is not a registered player the process progresses to a step 1164 wherein the player must complete the registration process. In one embodiment the registration process comprises an on-line process of providing personal data and financial information that is downloaded to the gaming server. In another embodiment the process of registration requires that the gaming server operator take additional steps to prevent the acceptance of wager from persons other than the bettor for whom the wagering account is established. Thus, in one example method of registration, the player must personally appear at the premises of the operator of the gaming server or, for central site facilities, at an out-station, satellite or affiliated location, to open a wagering account.

During the registration process the gaming personnel may optionally examine the presence of the player items such as the player's drivers license, passport, alien identification card, government issued identification card or credential or other picture identification normally acceptable as a means of identification when cashing checks. At such time the gaming employee may record information such as the players name, address, and telephone number. In addition, information such as players date of birth, social security number may be recorded. Further, the player identification number, for gaming server access, may be assigned and a password selected. Financial information may also be taken and account deposits accepted or credit limits established. It is also anticipated that a signature of the player be recorded for purposes of accountability.

If, at step 1162, the player is registered, the operation progresses to a step 1166 wherein the player is prompted for their gaming selection data. It is contemplated that the process of game selection data and wager type selection step 1166 generally resemble the process of FIGS. 2–10. Accordingly, the process is not described again in detail.

After the player inputs their gaming selections the operation progresses to a step 1168 wherein the player is requested to confirm their gaming selections. Upon confirmation, the operation, at a step 1170, initiates the call-back wagering process. The call-back wagering process, illustrated in detail in FIG. 15, performs location verification and officially registers the player's gaming selection with the gaming server. In one embodiment, the bet or wager is not placed until the location verification occurs.

Figure 15:
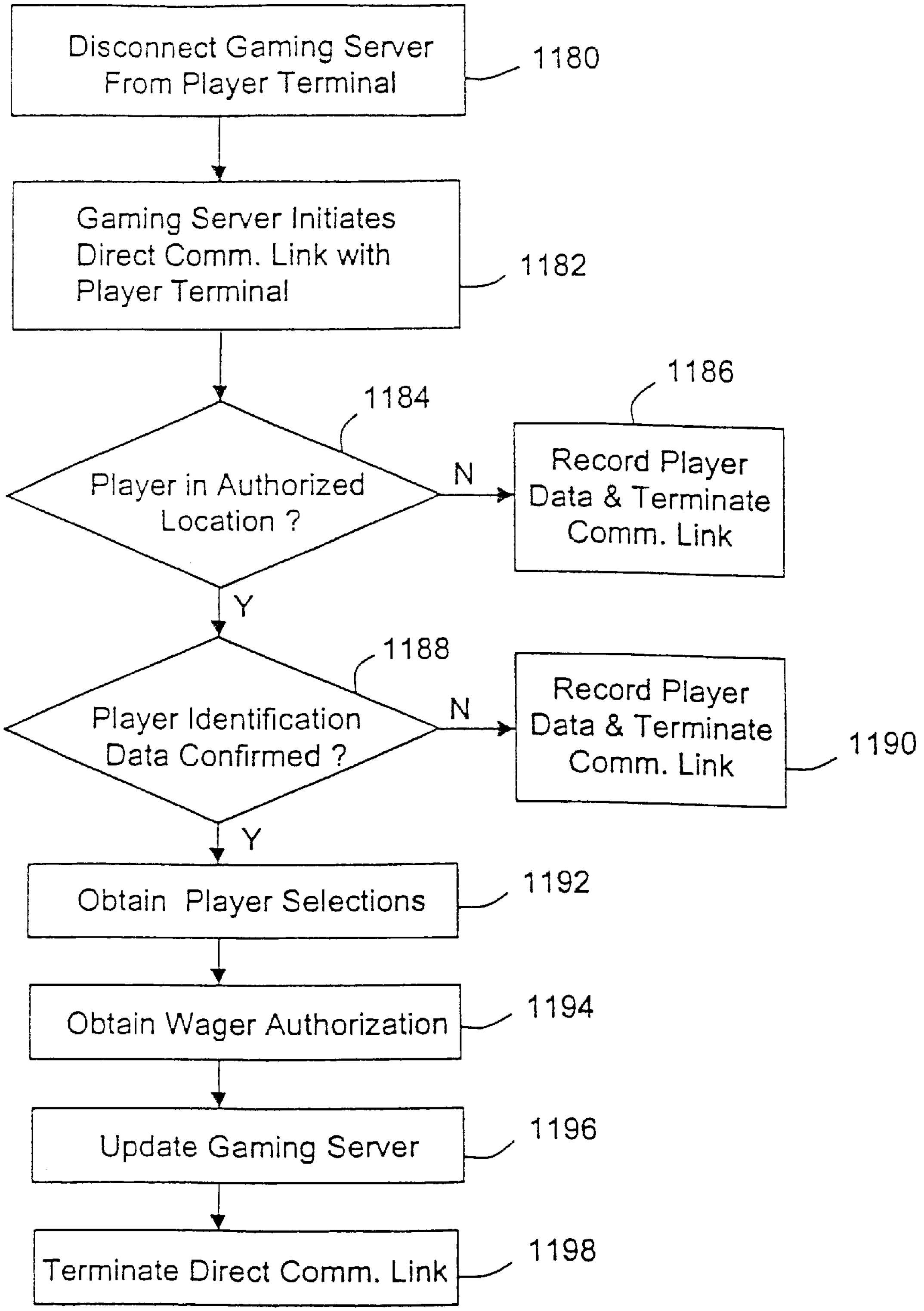
FIG. 15 illustrates a detailed operation flow diagram of a process for the location verification call-back process and officially placing a player's wager.

In reference to FIG. 15, the call-back wagering process of step 1170 (FIG. 14) is shown in detail. The call-back wagering process comprises at a step 1180 disconnecting the player and the gaming server i.e. or terminating the communication link between the player and gaming server. Next, at a step 1182 the gaming server initiates a direct communication link from the player's computer or terminal to the gaming server. In one embodiment the direct communication link is made through or in conjunction with the location verification module. In one embodiment the gaming server initiates the call to the player. In another embodiment the player's computer or terminal initiates the call to the location verification module of the gaming server or directly to the gaming server. In yet another embodiment both systems independently call each other using independent communication links.

Next, at a decision step 1184, the operation verifies the player is an authorized location. In one embodiment the gaming system utilizes a location verification module to determine the location of the player. One method of determining player location is using ANI data such as Caller ID data to determine and evaluate the location of the calling party. It is contemplated that other methods and apparatus will be available in the future for detecting the originating location of a call. For example, Federal Communication Commission regulations propose that the originating location of all cellular telephone calls be accessible or determinable. Hence, the scope of the present invention should not be limited to the particular method by which the location of the player is evaluated. Any method of verifiably and accurately determining the location of the player is compatible with the teachings of the present invention.

If the player is not at an authorized location, the operation progresses to a step 1186 and the system records the player data and terminates the direct communication link. The gaming system records the player data to prevent fraud.

Alternatively, if the location of the player is matched to an authorized location, such as within the boundaries of a particular state, the operation communicates with the player computer or terminal to analyze the identification data of the player to thereby verify that the direct communication link has been established with the proper computer. If the gaming system does not confirm the player identification the operation progresses to a step 1190 wherein the player data is recorded and the communication link terminated to prevent fraud.

If the gaming server confirms the player identity, then the gaming server obtains the player gaming selections. This occurs at a step 1192 and in this embodiment occurs automatically, although in other embodiments it may occur manually after input from the player. The player gaming selections comprise the wagering selections or choices made by the player. For example, this data may comprise what team or individual to bet on, or the outcome of an event.

Next, at a step 1194, the operation obtains wager authorization and amounts. Wager authorization comprises confirmation, stored on the player computer or terminal, that the player wants to place a wager or take a position. In other embodiments the player computer or terminal may exchange other types of data. In one embodiment the gaming server records the date each wager is accepted, assigns a betting number, such as confirmation number, and the amount of the wager.

Next, at a step 1196, the operation updates the gaming server records regarding the player gaming selections and the wager authorization. This is the occurrence of the official wager placement. In one embodiment the server computer transmits a confirmation number to the player computer or terminal. It is anticipated that all wagering communication be electronically recorded and retained for a period, such as for example, 60 days. Thereafter, at a step 1198 either of the gaming server or the player computer terminates the direct communication link.

To obtain confirmation of the player actions, the player may optionally reconnect to the gaming server via the player interface. Hence, it is anticipated that the direct communication link with location verification is only made for placing a wager. Therefore, in one hypothetical environment, a resident of a state that allows gaming can arrange desired betting selections via the Internet and the player interface. Once initiated, the location verification call-back process automatically calls back the player and officially places the bet. The location verification process insures that the player is within the boundaries of a particular location, such as a state to comply with various laws and regulations. One example set of laws and regulations are contained in the Nevada Gaming Code Regulation sections 5 and 22, revision of 2/99, both of which are incorporated herein in their entirety by reference. These regulations provide guidance regarding one exemplary set of laws or regulations that exist in the great State of Nevada. It is contemplated that one embodiment of the present invention would be configured to comply with these laws and regulations.

In another example environment the player gaming stations are established at gaming centers. Instead of logging in from a home computer or terminal, players utilize a computer or terminal at a gaming center to investigate possible gaming options and place wagers. The player then receives a confirmation number and may utilize the confirmation number to access and confirm their wager via a computer having access to the Internet, regardless of the location of the computer and player when confirming the wager data.

The above described method and apparatus may be configured to accept wagers from an individual within a particular location, such as a state, or in other configurations, from player in any number of states, or to reject participation from individuals in one state, such as for example, New York, or in a few states.

In other embodiments, various other methods of determining who to accept gaming from may be employed. Hence, the present invention should not be considered to be limited to only configurations that allow for participation based location of the player. In other arrangements, the present invention could alternatively or additionally limit or allow participation to players of certain financial means, players having completed gaming education and understanding courses, pre-registered and pre-paid players, players whose age is predetermined, or players whose telephone number has been predetermined.

It should also be noted that the present invention is not limited to configurations that locate the gaming server at a particular location, such as a casino or even a particular state. Modern electronics provide for numerous and various different configurations that achieve the aspects of the present invention. In yet another variation, the present invention may advantageously be utilized in various environments besides gaming. For example, the taking of call in, or computer polls that are limited to input from a particular district would benefit from the location verification capability of the present invention. Likewise, various voting requirements that are limited to voters from a particular area or group could be accommodated by the present invention's location verification or calling line analysis. These types of applications can be broadly described as on-line activities. In one embodiment, a list of authorized telephone numbers are maintained by the server and only parties calling from the numbers on the server maintained list may participated in the particular on-line activity.

In yet another embodiment of the present invention, the gaming system is established as an Internet Service Provider (hereinafter ISP) or similar communication device configured to facilitate communication with a computer network. As known by those of ordinary skill in the art, an ISP facilitates connection to a computer network by a remotely located user desiring to connect to the computer network. One exemplary computer network currently is operation is known as the Internet. For purposes of understanding this alternative embodiment is discussed in terms of the Internet, but other computer networks may be substituted in place of the Internet.

FIG. 16 illustrates a block diagram of one example configuration of this alternative embodiment. For purposes of understanding, like elements are referenced with like reference numerals. As shown, the gaming ISP 1200 provides means for one or more subscribers 119 to connect to an automated gaming system 1202 configured within an ISP. The gaming ISP 1200 includes ISP module 1204, a location verification module 1206 and the automated gaming system 1202 as described above. Operation of the automated gaming system 1202 occurs in a manner described above and accordingly is not described again. The gaming ISP 1200 includes communication hardware and software to facilitate connection by a subscriber 119 to the Internet 1210. The location verification module 1206, as described above, utilizes ANI data to determine the location of the subscriber 119.

FIG. 17 illustrates a more detailed exemplary block diagram of an alternative embodiment of the present invention. As shown, a gaming ISP 1200 is provided to allow one or more subscribers 119 to connect to an automated gaming system or the Internet. It is contemplated that the player would connected to the gaming ISP via any of a conventional telephone line, a radio communication link, cable modem, wireless digital, cellular, satellite, fiber optic link or any other suitable communication link designed to achieve the exchange of data between two remote locations.

Associated with the gaming ISP 1200 is a communication module 1220. The communication module 1220 comprises hardware and software configured to achieved communication between one or more remote subscribers 119 and the other components of the gaming ISP 1200. IPS communication hardware and software is known by those of ordinary skill in the art and for purposes of brevity, a detailed description is not provided herein.

A gaming intranet 1222 connects to the communication module 1220. In one embodiment the gaming intranet 1222 comprises a local network of the ISP configured to provides a network for servicing the subscriber 119. The gaming intranet 1222 connects to a location verification module 1206 and to communication ports that provide communication with the Internet 1210. Thus, via the intranet 1222 subscriber 119 may access either of the modules of the automated gaming system 1202 or the Internet 1210.

A location verification module 1206 connects to the gaming intranet 1222. In one embodiment the location verification module 1206 comprises a compilation of software, hardware and data storage devices. A subscriber 119 or other ISP 1200 subscriber may access the Internet 1210 via the gaming intranet 1222. It is also contemplated that the gaming intranet 1222 may provide all manner of information to the gaming ISP subscriber 119 such as information regarding the automated gaming system 1202, casino, or services. In other embodiment the gaming ISP 1200 may be configured without a gaming intranet 1222 wherein the ISP communication module 1220 would facilitate connection to the Internet 1210 or the location verification module 1206.

It is anticipated that the ISP communication module 1220 accepts data from incoming calls regarding the location of the subscriber 119 in the form of ANI data. As known by those of ordinary skill in the art and as discussed above in greater detail, ANI data may be used to identify the number, and hence the location, of the line on which the incoming call was made. In one embodiment the ISP communication module 1220 collects and forwards or passes through the ANI information to the gaming intranet 1222. The gaming intranet 1222 forwards this information to the location verification module 1206. The location verification module 1206 analyzes data regarding the location of the calling party, in one scenario a player of the automated gaming system 1202. In other embodiments other methods and apparatus may be utilized to determine the location of the calling subscriber 119.

The location verification module 1206 compares the location of the calling party to data regarding authorized locations. An authorized location comprises locations from which calls to the automated gaming system 1202 are allowed. For example, in one example embodiment, calls placed within the state of Nevada are allowed access to the automated gaming system 1202. In another embodiment, calls from outside the United States are allowed to access the automated gaming system 1202. Any criteria may be established for allowing access to the gaming system 1202.

A player interface 114 connects to the location verification module 1206. The player interface 114 facilitates access to the automated gaming system 1202 and provides a software oriented user interface. An administration interface 116 and player data module 112 and a gaming data module 108 connect to the player interface 114. In one embodiment the player data module 112 and the gaming data module 108 comprise one or more storage devices configured to store player and game data. The player interface 114, administrative interface 116, the player data module 112, and game data module 108 operation in the manner described above.

The present invention configured as a gaming ISP 1200 operates as shown in FIG. 18. It is fully anticipated that various other methods of operation may be adopted by those of ordinary skill in the art without departing from the scope of the invention as claimed below. At a step 1250, a player utilizes some form of communication software and hardware to connect to the gaming ISP. After having established a communication link with the gaming ISP the player accesses the gaming intranet. This occurs at a step 1252. At the gaming intranet the player may optionally obtain information be presented with other options.

Next, the operation progresses to a decision step 1254 wherein the player may optionally access the Internet. If the player desires to connect to the Internet the operation progresses to a step 1256 and the gaming ISP establishes a connection to the Internet. The player may optionally exit the Internet or return to the gaming intranet at step 1262.

Alternatively, if at step 1254 the player desires to access the automated gaming system the operation progresses to a step 1264. Next, at a step 1266, the operation, using the location verification module, determines the location of the caller. In one embodiment the caller comprises an individual intending to access the automated gaming system.

At decision step 1268, the location verification module determines if the incoming call was made from a location authorizing participation in a system of the present invention. Of course, in other embodiments the location verification system may be used to determine access to any type of activity that is limited to a particular area or a particular class or group of people wherein participation can be determined by the information obtained upon reception of a call. For example, it is contemplated that the present invention may be configured as other than an automated gaming system. By way of example and not limitation, the present invention having location verification capability may be used for voting, polling, or other types of decision making processes.

If at decision step 1260 the player is not calling from an authorized location, the operation progresses to a step 1252 wherein the caller may exit the system or access the Internet. Alternatively, if the caller is calling from an authorized location, the operation progresses to a step 1270 and the operation connects the caller to the player interface. At step 1272 the player may access and utilize, the features of the automated gaming system as described above.

Of course this is but one exemplary configuration and associated method of operation of the present invention. Other configuration and methods of operation are anticipated by the inventors and should be considered to be covered by the scope of the claims below.

Figure 10:
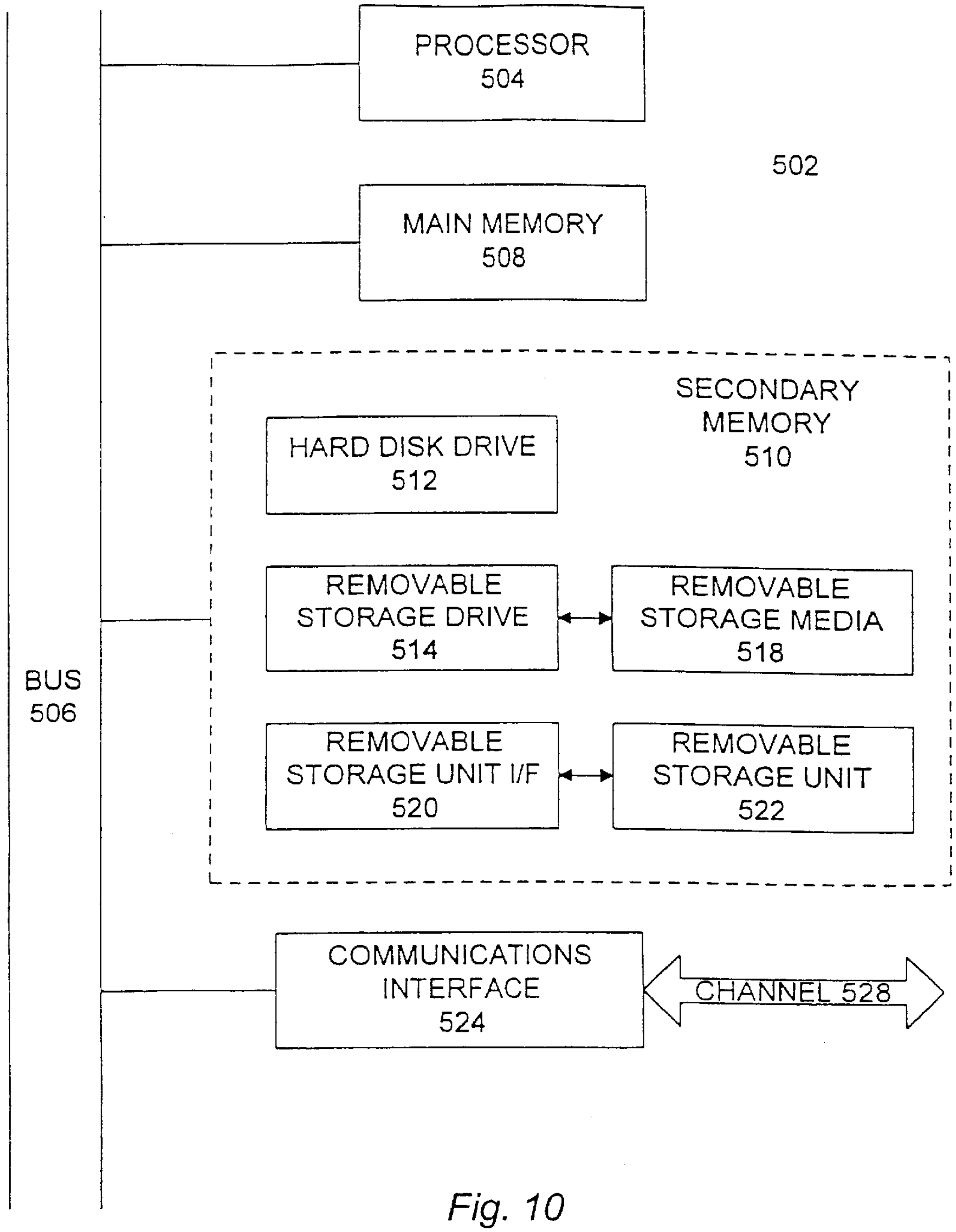
FIG. 10 is a block diagram illustrating an example processor-based system according to one embodiment of the invention.

The various embodiments, aspects and features of the invention described above may be implemented using hardware, software or a combination thereof and may be implemented using a computing system having one or more processors. In fact, in one embodiment, these elements are implemented using a processor-based system capable of carrying out the functionality described with respect thereto. An example processor-based system 502 is shown in FIG. 10 according to one embodiment of the invention. The computer system 502 includes one or more processors, such as processor 504. The processor 504 is connected to a communication bus 506. Various software embodiments are described in terms of this example computer system. The embodiments, features and functionality of the invention as described above are not dependent on a particular computer system or processor architecture or on a particular operating system. In fact, after reading this document, it will become apparent to a person of ordinary skill in the relevant art how to implement the invention using other computer or processor systems and/or architectures.

Processor-based system 502 can include a main memory 508, preferably random access memory (RAM), and can also include a secondary memory 510. The secondary memory 510 can include, for example, a hard disk drive 512 and/or a removable storage drive 514, representing a floppy disk drive, a magnetic tape drive, an optical disk drive, etc. The removable storage drive 514 reads from and/or writes to a removable storage medium 518 in a well known manner. Removable storage media 518, represents a floppy disk, magnetic tape, optical disk, etc. which is read by and written to by removable storage drive 514. As will be appreciated, the removable storage media 518 includes a computer usable storage medium having stored therein computer software and/or data.

In alternative embodiments, secondary memory 510 may include other similar means for allowing computer programs or other instructions to be loaded into computer system 502. Such means can include, for example, a removable storage unit 522 and an interface 520. Examples of such can include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 518 to computer system 502.

Computer system 502 can also include a communications interface 524. Communications interface 524 allows software and data to be transferred between computer system 502 and external devices. Examples of communications interface 524 can include a modem, a network interface (such as, for example, an Ethernet card), a communications port, a PCMCIA slot and card, etc. Software and data transferred via communications interface 524 are in the form of signals which can be electronic, electromagnetic, optical or other signals capable of being received by communications interface 524. These signals are provided to communications interface via a channel 528. This channel 528 carries signals and can be implemented using a wireless medium, wire or cable, fiber optics, or other communications medium. Some examples of a channel can include a phone line, a cellular phone link, an RF link, a network interface, and other communications channels.

In this document, the terms "computer program medium" and "computer usable medium" are used to generally refer to media such as removable storage device 518, a disk capable of installation in disk drive 512, and signals on channel 528. These computer program products are means for providing software or program instructions to computer system 502.

Computer programs (also called computer control logic) are stored in main memory 508 and/or secondary memory 510. Computer programs can also be received via communications interface 524. Such computer programs, when executed, enable the computer system 502 to perform the features of the present invention as discussed herein. In particular, the computer programs, when executed, enable the processor 504 to perform the features of the present invention. Accordingly, such computer programs represent controllers of the computer system 502.

In an embodiment where the elements are implemented using software, the software may be stored in, or transmitted via, a computer program product and loaded into computer system 502 using removable storage drive 514, hard drive 512 or communications interface 524. The control logic (software), when executed by the processor 504, causes the processor 504 to perform the functions of the invention as described herein.

In another embodiment, the elements are implemented primarily in hardware using, for example, hardware components such as PALs, application specific integrated circuits (ASICs) or other hardware components. Implementation of a hardware state machine so as to perform the functions described herein will be apparent to persons skilled in the relevant art(s). In yet another embodiment, elements are implemented using a combination of both hardware and software.

In an embodiment where the elements are implemented using software, the software may be stored in, or transmitted via, a computer program product and loaded into computer system 502 using removable storage drive 514, hard drive 512 or communications interface 524. The control logic (software), when executed by the processor 504, causes the processor 504 to perform the functions of the invention as described herein.

4. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Furthermore, it is fully contemplated that any of the above-recited features of the present invention may be combined in any manner to create additional embodiments comprised of a combination of different features from the various above-recited embodiments.

We claim:

1. A method for achieving participation in an on-line activity wherein only certain parties are allowed to participate in said on-line activity, said method comprising:

providing access to one or more parties via a computer network to said on-line activity, said one or more parties using a personal computing device to connect to an on-line computing device over said computer network;

making a first player location determination based on the verifiable address of the personal computing device used to access the network;

presenting on-line activity options to said one or more parties so that said one or more parties may make selections from said options;

storing said selections made by said one or more parties on either of said personal computing device or said on-line activity computing device;

establishing a direct communication link over a non-shared network between said personal computing device and said on-line computing device;

making a second player location determination based on information obtained over said direct communication link; and accepting said stored selections at said on-line computing device if said first and second player location determinations indicate that one or more parties are authorized to participate.

2. The method of claim 1, wherein said second player location determination comprises utilizing caller identification information to determine said phone number of said one or more parties.

3. The method of claim 1, wherein said computer network comprises the Internet.

4. The method of claim 1, wherein said communication link comprises a circuit through the PSTN.

5. A method as claimed in claim 1, wherein the on-line activity comprises making gaming wagers, and wherein the on-line computing device is a part of a gaming control center.

* * * * *